(12) United States Patent
Mishra et al.

(10) Patent No.: US 11,903,095 B2
(45) Date of Patent: Feb. 13, 2024

(54) 5G OPENRAN CONTROLLER

(71) Applicant: Parallel Wireless, Inc., Nashua, NH (US)

(72) Inventors: Rajesh Kumar Mishra, Westford, MA (US); Eugina Jordan, Leominster, MA (US)

(73) Assignee: Parallel Wireless, Inc., Nashua, NH (US)

( * ) Notice: Subject to any disclaimer, the term of this patent is extended or adjusted under 35 U.S.C. 154(b) by 80 days.

(21) Appl. No.: 17/117,107

(22) Filed: Dec. 9, 2020

(65) Prior Publication Data

US 2021/0176823 A1  Jun. 10, 2021

Related U.S. Application Data

(60) Provisional application No. 62/945,876, filed on Dec. 9, 2019.

(51) Int. Cl.

| | |
|---|---|
| *H04W 16/18* | (2009.01) |
| *H04W 88/16* | (2009.01) |
| *H04W 88/18* | (2009.01) |
| *H04W 92/14* | (2009.01) |
| *H04W 92/20* | (2009.01) |
| *H04W 84/12* | (2009.01) |

(52) U.S. Cl.
CPC ........... *H04W 88/18* (2013.01); *H04W 16/18* (2013.01); *H04W 88/16* (2013.01); *H04W 92/14* (2013.01); *H04W 92/20* (2013.01); *H04W 84/12* (2013.01)

(58) Field of Classification Search
CPC ..... H04W 88/18; H04W 16/18; H04W 88/16; H04W 92/14; H04W 92/20; H04W 84/12
See application file for complete search history.

(56) References Cited

U.S. PATENT DOCUMENTS

| | | | |
|---|---|---|---|
| 11,528,636 B2 | 12/2022 | Mishra et al. | |
| 2015/0257051 A1* | 9/2015 | Rao ....................... | H04W 36/14 |
| | | | 455/552.1 |
| 2017/0135099 A1* | 5/2017 | Song ..................... | H04W 76/25 |
| 2017/0230818 A1* | 8/2017 | Park ....................... | H04W 8/26 |
| 2018/0205722 A1* | 7/2018 | Getschmann ....... | H04L 63/0876 |
| 2021/0045193 A1 | 2/2021 | Mishra et al. | |
| 2021/0176823 A1 | 6/2021 | Mishra et al. | |
| 2021/0243156 A1 | 8/2021 | Mishra et al. | |
| 2021/0289433 A1 | 9/2021 | Mishra et al. | |

* cited by examiner

*Primary Examiner* — Jinsong Hu
*Assistant Examiner* — Farideh Madani
(74) *Attorney, Agent, or Firm* — Michael Y. Saji; David W. Rouille

(57) ABSTRACT

A device, method and software are presented for a 5G OpenRAN controller. In one embodiment the 5G OpenRAN controller includes an interface for an EPC virtualization stack; an interface for a radio virtualization stack; a software suite executing on the 5G OpenRAN controller; and wherein the 5G OpenRAN controller virtualizes existing cells into a pool of virtualized resources that can be allocated dynamically and virtualizes multiple cores into a pool of resources for multi-technology RANs and presents them as standard interfaces to a packet core.

20 Claims, 14 Drawing Sheets

5G OPENRAN CONTROLLER

CROSS-REFERENCE TO RELATED APPLICATIONS

This application claims priority under 35 U.S.C. § 119(e) to U.S. Provisional Pat. App. No. 62/945,876, filed Dec. 9, 2019, and titled "5G OpenRAN Controller," which is hereby incorporated by reference in its entirety for all purposes. The present application also hereby incorporates by reference each of U.S. patent application Ser. No. 16/947,298, filed Jul. 27, 2020 "5G OpenRAN Controller"; U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. patent application Ser. No. 62/375,341, "S2 Proxy for Multi-Architecture Virtualization," filed Aug. 15, 2016; each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and U.S. patent application Ser. No. 15/713,584. This application also hereby incorporates by reference in their entirety U.S. patent application Ser. No. 16/424,479, "5G Interoperability Architecture," filed May 28, 2019; U.S. Provisional Pat. Application No. 62/804,209, "5G Native Architecture," filed Feb. 11, 2019; U.S. Provisional Pat. Application No. 62/876,264, "5G Mobile Network Solution With 5G SA RAN with EPC Solution," filed Jul. 19, 2019; U.S. Provisional Pat. Application No. 62/873,463, "5G Mobile Network Solution With Intelligent 5G NSA RAN Solution," filed Jul. 12, 2019; U.S. Provisional Pat. Application No. 62/879,200, "5G Enhanced HetNet Gateway," filed Jul. 26, 2019; and U.S. Provisional Pat. Application No. 62/909,226, "5G/4G/3G/2G Cloud-Native OpenRAN Architecture," filed Oct. 1, 2019.

BACKGROUND 5G is the next generation Mobile Communication technology following the 4G/LTE. 3GPP has been working on defining the standards for 5G as part of 3GPP Rel 15 and 16. Starting 1G and then followed by 2G, 3G and 4G, each generation has the laid the foundation for the next generation in order to cater to newer use cases and verticals. 4G was the first generation that introduced flat architecture with all-IP architecture. 4G enabled and flourished several new applications and use case. 5G is going to be not just about higher data rates but about total user experience and is going to cater to several new enterprise use cases like Industrial automation, Connected Cars, Massive IOT and others. This will help operators to go after new revenue opportunities.

Launching 5G network will need significant investment as it will need RAN and Packet Core upgrade. 3GPP has defined a new 5G NR and new 5G Core. Eventually all the operators will want to head towards a complete 5G network coverage with the new 5G Standalone Core, given the several new features and capabilities that the new 5G Standalone network brings in. But given the significant cost involved, 3GPP has defined number of different intermediate solutions that can provide gradual migration from current 4G network to the eventual native 5G network.

SUMMARY

A 5G OpenRAN controller is described. In one embodiment the 5G OpenRAN controller includes an interface for an EPC virtualization stack; an interface for a radio virtualization stack; a software suite executing on the 5G OpenRan controller; and wherein the 5G OpenRAN controller virtualizes existing cells into a pool of virtualized resources that can be allocated dynamically and virtualizes multiple cores into a pool of resources for multi-technology RANs and presents them as standard interfaces to a packet core.

In another embodiment a method of operating a 5G OpenRAN controller is described. The method includes providing an interface for an EPC virtualization stack; providing an interface for a radio virtualization stack; executing a software suite on the 5G OpenRan controller; and wherein the 5G OpenRAN controller virtualizes existing cells into a pool of virtualized resources that can be allocated dynamically and virtualizes multiple cores into a pool of resources for multi-technology RANs and presents them as standard interfaces to a packet core.

In another embodiment, a non-transitory computer-readable medium containing instructions for operating a 5G OpenRAN controller is described which, when executed, cause the OpenRAN controller to perform steps comprising: providing an interface for an EPC virtualization stack; providing an interface for a radio virtualization stack; executing a software suite on the 5G OpenRan controller; and wherein the 5G OpenRAN controller virtualizes existing cells into a pool of virtualized resources that can be allocated dynamically and virtualizes multiple cores into a pool of resources for multi-technology RANs and presents them as standard interfaces to a packet core.

DETAILED DESCRIPTION

Figure 1:
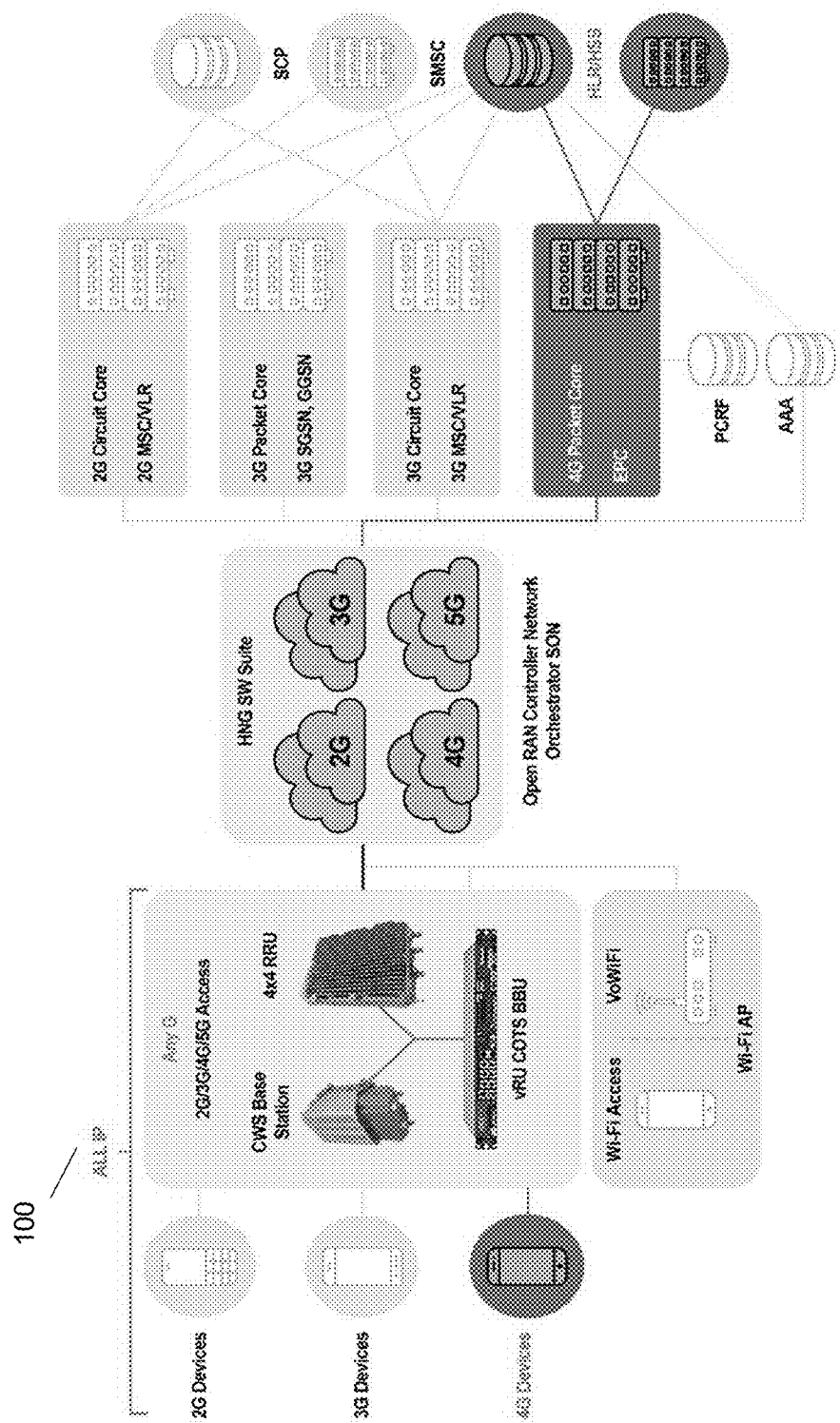
FIG. 1 is a diagram showing an OpenRAN system, in accordance with some embodiments.

Parallel Wireless is leading the OpenRAN movement with the world's first 5G/4G/3G/2G cloud-native OpenRAN architecture that is open and standardized across five key domains—RAN, Edge, Core, Orchestration and Analytics.

As well, through deep collaboration with our OpenRAN ecosystem partners, we have created a fully-compliant OpenRAN ecosystem that is capable of delivering the next generation of wireless infrastructure at dramatically lower cost, ensuring more equal access to 5G across the globe.

Our OpenRAN portfolio is designed to help our customers modernize their networks, reduce deployment cost and complexity, increase operational efficiency, find new revenue streams and start deploying multi-vendor 5G networks—today.

Parallel Wireless created world's only ALL G software-defined OpenRAN architecture to make delivery of wireless coverage or capacity use cases, especially capital intensive 5G, affordable as it enables mobile operators and industries to unleash the full value of connectivity. With unified across 5G 4G 3G 2G cloud-native architecture that is open and standardized across five key domains—RAN, Edge, Core, Orchestration and Analytics—we are committed to 5G vision of bringing Internet to every person and organization for a truly connected world and at much lower cost to deploy and maintain. The company's end-to-end ALL G cloud-native OpenRAN portfolio is designed to help our customers modernize their networks, reduce deployment cost and complexity, increase operational efficiency, find new revenue streams and start deploying multi-vendor 5G networks today. Through open collaboration with OpenRAN ecosystem partners, we created world's first and largest fully compliant OpenRAN ecosystem that delivers the next generation of wireless infrastructure to be much lower cost ensuring more equal access to 5G globally. Our customers include over 60 global mobile operators, as well as private and public industries and governments that use our software defined network portfolio to reimagine their networks' economics.

The Parallel Wireless solution enables innovative capacity, coverage, and upgradeability. Parallel Wireless OpenRAN supports indoor or outdoor deployment scenarios at the lowest TCO and can be deployed on an accelerated timeline to help mobile operators deliver coverage everywhere from rural to suburban to most dense urban. Easy to install, low-cost and high-performing cloud-native Parallel Wireless OpenRAN supports macro, Massive MIMO or small cell deployments for densification and delivers superior end user QoS for consumers and industries in urban scenarios. Parallel Wireless cloud-native OpenRAN approach enables any 5G migration option and is software upgradable to any future 3GPP releases delivering the most cost-effective, easy to deploy, and advanced 5G capabilities for all 5G use cases.

Cloud-native, fully virtualized architecture with a flexible end-to-end orchestration framework includes:

Globally deployed OpenRAN solution supporting multiple 3GPP compliant RAN splits, easy to deploy and maintain with Parallel Wireless SON module. The OpenRAN architecture enables the Remote Radio Units (RRUs) to interwork with the virtualized COTS-based Base Band Unit (vBBU) over Ethernet Fronthaul (FH), overcoming the traditional constraints of Common Public Radio Interface (CPRI™) over fiber. The OpenRAN hardware is remote-upgradable Software Defined Radio (SDR) capabilities from any G to 5G.

Network software to support easy install, hands-free maintenance, end-to-end network slicing, vCU functionality and Multi-access Edge Computing (MEC)—the solution can be tailored for service-centric architectures, meeting user expectations while delivering lowest deployment cost.

Parallel Wireless 4G delivers the following benefits: Cloud-native architecture across all components: OpenRAN software abstracts Core and RAN and brings 5G-like benefits to 4G (with low latency and network slicing). Data traffic local breakout through utilization of CUPS can deliver low latency into 4G networks today. Easy to deploy, manage, and scale: The software platform automates network optimization to reduce deployment cost. Self-configuration makes radios plug-and-play. Self-optimization reduces the need for drive testing and results in cost reduction. Radio is software-defined to upgrade user count and technologies, so sites can be software upgradable to higher capacity with COTS BBU or 5G when needed. Orchestration enables optimal network performance, which results in superior end-user QoE with seamless mobility, preventing subscriber churn. Lowest TCO: Automation reduces the need to travel on-site or use professional services. Hands-free optimization of PW SON saves on on-going maintenance. Future-proof and easy migration to 5G: Software platform enables 5G-native architecture which is upgradable to any 3GPP release in the future and can enable any 5G migration option. Virtualization of gateways (like Security gateway, Small Cells gateway, Wi-Fi gateways, etc.) as VNFs allows flexibility to introduce new components and services within the network.

Parallel Wireless Edge Core that consists of vEPC and 5G core as VMs and is designed for mobile communications systems with the functional capabilities to support high bandwidth and ultra-low latency applications. 5GC includes complete separation of both control and user plane framework to allow dynamic scaling of control and user plane elements with intelligent packet handling through Parallel Wireless Network Intelligence software module.

Both access and core offerings are enabled by its network functions virtualization (NFV) and container management and orchestration software platform.

Through open collaboration with OpenRAN ecosystem, we've created the world's first and largest fully compliant OpenRAN portfolio that delivers the next generation of wireless infrastructure at a much lower cost, ensuring more equal access to 5G globally. Our software-defined and interoperable OpenRAN architecture was designed from the ground up to reduce complexity and drive out cost from every aspect from the RAN to the Core. We pride ourselves on offering a fully automated outdoor or indoor coverage and capacity solutions that are easy and cost-effective to deploy and maintain and are software upgradable to 5G.

The company's end-to-end ALL G cloud-native OpenRAN portfolio is designed to help our customers modernize their networks, reduce deployment cost and complexity, increase operational efficiency, find new revenue streams and start deploying multi-vendor 5G networks today. Software innovation and openness across 5G/4G/3G/2G and Wi-Fi coupled with network automation drives TCO reduction for low-density or high density use cases of up to 60% for CAPEX and 65% for OPEX.

The Parallel Wireless OpenRAN Controller is the industry's first and most innovative fully virtualized and scalable OpenRAN controller that supports E2 interface and orchestrates multi-vendor outdoor and indoor 5G 4G 3G 2G RAN and automates radio and network optimization and analytics while reducing deployment and maintenance cost. Easy to deploy and maintain fully virtualized 2G with Parallel Wireless cloud-native OpenRAN is the cost-effective migration path to 3G, 4G or 5G when your subscribers are ready.

Service-aware cloud-native wireless core solution with advanced QoS and scalability for dynamic IP, mobility and policy management. Parallel Wireless core network software concentrates all eNBs and provides a single S1-U connection to S-GW for data traffic and a single S1-MME connection to MME for all signaling and control related traffic. It acts as an aggregator of S1 signaling toward S-GW and MME. This reduces all handover and paging related signaling and control messages toward the core network (EPC). The Parallel Wireless EPC is a full LTE core solution consisting of MME, SGW, and PGW, or any combination of these, deployed as Virtual Network Functions (NFV) on a COTS hardware or virtualized infrastructure. Its scalable architecture allowed flexible deployments offering one of the best performance-to-price ratios in the industry. As a part of Policy and Charging Control (PCC) functionality, Parallel Wireless provides PCRF portion of it to integrate with our EPC through standard Gx interface. This provides a fast deployment path toward a complete and operational network for our customers.

Leading an OpenRAN Movement

The RAN accounts for around 60% of CAPEX and 65% of OPEX in the cellular network. It follows that carriers need to maximize the value of their existing network assets before giving the green light to new investment. With its software-defined and cloud-native OpenRAN architecture, and with the world's largest OpenRAN ecosystem, Parallel Wireless is leading the movement for wireless infrastructure innovation by delivering substantial cost savings to MNOs for building or maintaining both today's 4G/3G/2G networks and tomorrow's multi-vendor 5G networks.

The OpenRAN Hardware Ecosystem

The Parallel Wireless OpenRAN flexible and scalable architecture delivers disaggregation of hardware and software, along with decoupling of CU/DU functionality and support for any 3GPP compliant split. Our OpenRAN hardware ecosystem consists of Software Defined Radios (SDRs) that can be software upgraded to 5G for ease of deployment and lower cost, with no rip-and-replace. By separating RAN hardware from software, and by using commoditized GPP-based hardware, we believe we can kickstart the flywheel to enable an industry-wide ecosystem to drive down cost as a part of an end-to-end solution. Our software-based approach delivers ultra-high capacity access with absolutely no capacity or coverage limits and with the ability to cost-effectively extend resources to 5G, edge cloud, and MEC.

Benefits to MNOs

Parallel Wireless's dynamic architecture is the only available solution for mobile operators to utilize different splits based on morphology and infrastructure availability, delivering:

Flexibility in selecting any split based on use case. For coverage deployments, higher splits are more desirable, while for dense urban areas, lower splits are typically the optimum solution for delivering maximum capacity. Parallel Wireless products enable different protocol layers to reside in different components based on fronthaul availability and morphology.

OpenRAN. Parallel Wireless's dynamic solution allows mobile operators to pick and choose different hardware vendors for DU and CU, helping to get the best performance at much lower cost.

Lowest TCO. By using different software implementations on the same RAN hardware, the cost of operations and ownership for mobile operators is reduced by up to 30%.

Outdoor OpenRAN

The need for providing both coverage and capacity and supporting growing data consumption, all with declining ARPUs, have placed tremendous pressure on MNOs to find the most efficient use of their allocated radio spectrum.

FIG. 1 shows an outdoor OpenRAN 100 helps with spectrum optimization to provide improved profitability. The architecture consists of:

Virtualized Baseband Unit (vBBU)

Based on Intel-based COTS (x86) hardware, this component provides High-PHY, MAC, RLC and PDCP functionality in a central fashion. It communicates to a cluster of RRHs (which contains RF and lower PHY) and supports multiple carriers based on the RRH cluster's load. The interface between vRU and RRH is based on Ethernet-based eCPRI. This architecture supports 4G today and is software-upgradable to 5G.

Remote Radio Heads (RRH)

The Parallel Wireless solution incorporates standard, off-the-shelf RRHs and small cells from different OEMs. These OpenRAN RRHs and small cells can be integrated into our solution with minimum integration effort, reducing the overall cost of ownership for mobile operators.

Figure 2:
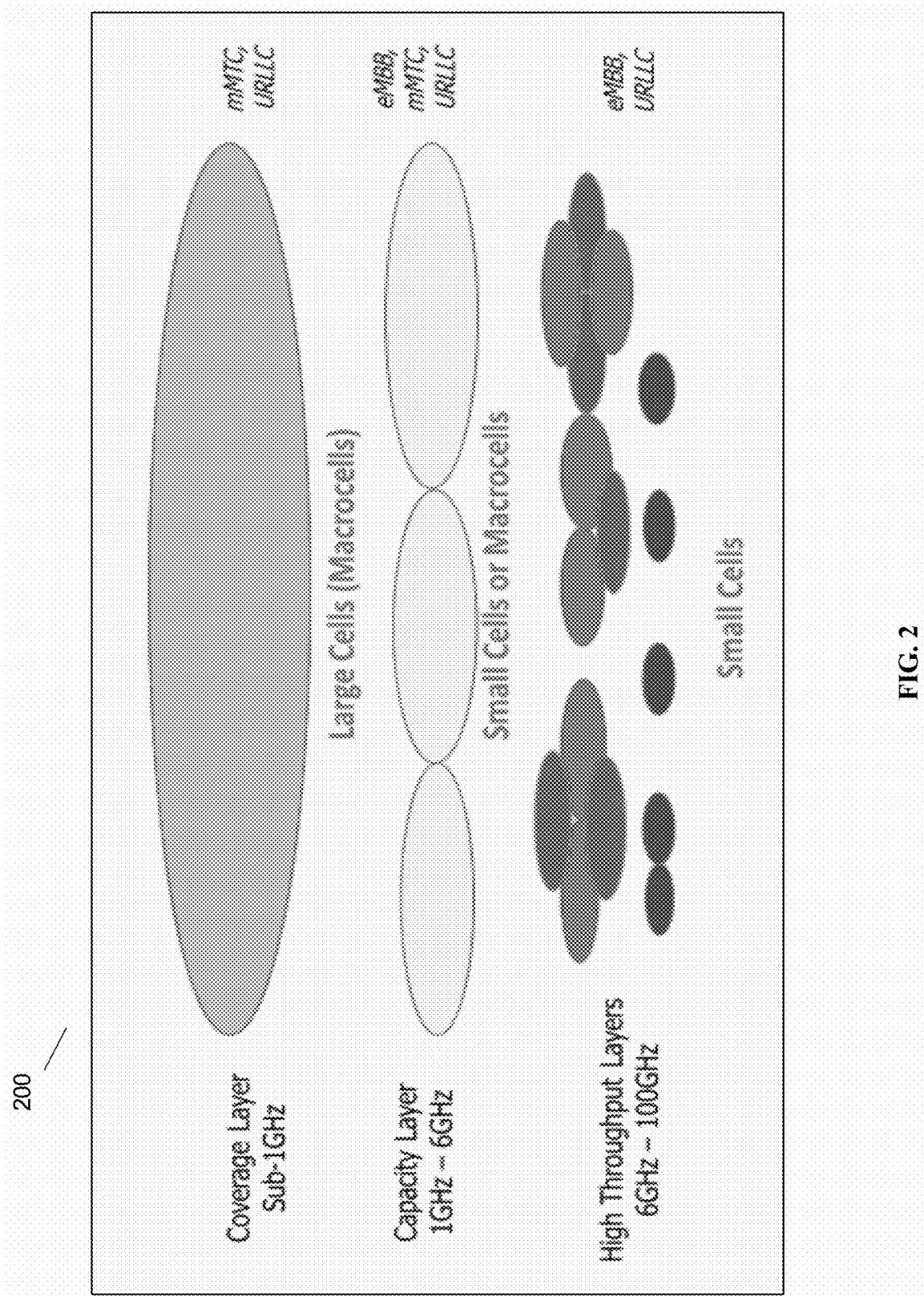
FIG. 2 is a diagram showing different cells of a wireless network, in accordance with some embodiments.

Parallel Wireless has developed extensive OpenRAN partnerships to support all use cases for coverage and capacity:

FIG. 2 is a diagram showing different cells of a wireless network 200, in accordance with some embodiments.

Macrocells

When operators build a network, they typically start by building a macro layer, mainly consisting of rooftop sites and towers to quickly deliver the largest possible coverage area. Parallel Wireless has an ecosystem of OpenRAN hardware to deliver the most efficient and powerful solutions to deliver coverage and capacity from 2×2, 4×4, 8×8 in different frequency bands—all software-defined and easily upgradable to 5G.

Massive MIMO

Moving from MIMO to massive MIMO, according to IEEE, involves making "a clean break with current practice," as it requires a large number of service antennas over active terminals, as well as time-division duplex operation. " . . . By focusing energy into ever smaller regions of space, [Massive MIMO brings] huge improvements in throughput and radiated energy efficiency." The group calls out other benefits including cheaper parts, lower latency, simplification of the MAC layer, and robustness against intentional jamming.

However, M-MIMO presents deployment challenges as well:

Heavier antennas, meaning that existing poles may not be able to bear the load, and any upgrades required will necessitate additional deployment costs.

Power upgrades, as new active antennas will consume more power, which will be an additional operational cost as well as capital cost.

Backhaul upgrades are necessary as well, as existing backhaul may not be able to cope with the projected massive increase in data traffic.

With Parallel Wireless and its massive MIMO ecosystem partners, MNOs can select hardware based on their 5G deployment cases, budget and subscriber needs. Our OpenRAN Massive MIMO delivers:

A compact solution with perfect component synchronization that is easy to deploy.

Support for any deployment scenario.

Internal power consumption reduction to achieve total energy efficiency reductions.

Small Cells 5G networks will push the limits for small cell deployments. The Parallel Wireless OpenRAN approach solves the triple challenge of interference, mobility and deployment:

A combination of intra- and inter-frequency underlay and overlay cells will be a common practice in 5G networks. In a spatial densification deployment the OpenRAN controller manages intra-cell interferences, and for a vertical densification deployment it will coordinate all load-related handoffs and other functionalities to utilize different layers accordingly, thus improving overall system performance and frequency utilization. The split concept (DU and CU) for 5G facilitates a simpler approach toward frequency coordination among different cells in a geographical area. This approach to small cell deployments enables different DUs with the same or different operating frequencies to be connected and coordinated through a single CU (Parallel Wireless vCU as a VNF in OpenRAN software suite).

All these interference mitigation techniques require tight coordination among different RRHs. Parallel Wireless OpenRAN coordinates with connected small cells directly, and also provides all required signaling to macro cells and reduces the overall system control signaling.

Besides interference issues, the densification of cellular networks can impact user experience due to increases in handoffs and related signaling loads. The increase of handoffs in a mobile system can directly impact the volume of signaling in the system and have a negative impact on overall user experience and system capacity. The Parallel Wireless OpenRAN controller dynamically executes parameter changes to optimize the user experience based on their mobility.

Indoor OpenRAN

Even those operators who are the most advanced in deploying Voice over LTE (VoLTE) technology realize that it will take many years before all voice traffic is carried over 4G. The necessary pairing of UE and core network VoLTE implementations means that 3G will remain an important voice solution for many years to come. This creates a dilemma for the operator, as clearly 4G/5G is the industry direction of travel, but 3G remains a critical voice technology. The Parallel Wireless 3G/4G OpenRAN solution for indoor/enterprise coverage is a 3GPP standards-based NFV-SDN-enabled solution easily scalable to suit any size enterprise to provide quality indoor coverage for voice and data. The solution is based on cellular access point (CAP)/enterprise femtocells, and integrates 3G and 4G/LTE with real-time network orchestration, flexible scheduling, interference mitigation, resource optimization, traffic prioritization, and enterprise-grade security. The indoor OpenRAN controller provides orchestration enabled by real-time network SON, resource optimization and traffic mitigation. It also enables seamless mobility for users indoors and out, and makes network deployments fast and simple with no RF planning or complex system integration required.

The Cellular Access Point (CAP). The OpenRAN indoor hardware is a software-defined, multi-mode, multi-band enterprise femto that provides cellular single-mode 3G or 4G or multi-mode/multi-carrier 3G/4G access in the same form factor, and provides low cost, high QoS coverage for enterprises of all sizes. The CAP combines 3G and 4G/LTE functions into a single footprint using common network connectivity and power, greatly simplifying the installation and maintenance process. This helps to achieve the right level of deployment flexibility and attractive economics for service providers to deliver a wide variety of enterprise deployments with the lowest cost per unit and coverage, providing CAPEX savings of over 90%.

The indoor OpenRAN solution uses Parallel Wireless's OpenRAN controller, the HNG, which provides enterprise gateway functionalities with many 3G/4G/Wi-Fi functions virtualized, including femto gateway, small cell gateway, and other functionalities. Normally the cost of these functionalities would be a significant extra. The controller software itself reduces the CAPEX by 90%, as it includes many gateway functionalities needed for enterprise solutions to manage licensed and unlicensed spectrum. The controller runs on any x86 server, with a well-understood CAPEX of a few thousands of dollars with plenty of capacity for high performance. The controller can be deployed in a remote or local cloud, and one HNG can serve many enterprises. OPEX will also be reduced with the HNG, as it will optimize the enterprise network, mitigate traffic, etc.

The suite runs on ETSI NFV Cloud Native solution that can be hosted on private, public or hybrid cloud with minimum hardware dependencies. The software suite consists of:

OpenRAN Controller: It performs a function of an OpenRAN controller and is responsible for radio connection management, mobility management, QoS management, edge services, and interference management for the end user experience. Different RAN functionalities consolidate on this software platform, reducing complexity and making overall network maintenance simpler and less resource intensive. Currently released OpenRAN controller module virtualizes vBSC/2G gateway, 3G gateway/vRNC, 4G gateway/X2 gateway, Wi-Fi gateway. The fully virtualized and scalable controller functionality supports O-RAN E2 interface and works with multi-vendor RAN. As a result, it helps create a multi-vendor, open ecosystem of interoperable components for the various RAN elements and vendors.

The OpenRAN Controller is a 2G/3G/4G/5G OpenRAN controller. Specifically, it: interworks between 3GPP RATs to enable base stations to interoperate with other base stations and core networks from another RAT, and between base stations of different vendors using various versions of the proprietary RAN management interfaces. In some embodiments, the OpenRAN controller is able to handle the different RATs by virtualizing them using the technology of the 5G OpenRAN gateway and/or HetNet Gateway. In some embodiments, the OpenRAN controller is able to handle the different versions of proprietary RAN/radio interfaces (for example, for RAN control or CU/DU split) by using an interworking proxy to interwork different unique radio management interfaces. For example, the OpenRAN controller can interwork a radio instruction with a 3G base station also managed by the controller.

An OpenRAN module provides interworking and coordinates DU/CU splits for the base station managed by the OpenRAN controller, in some embodiments. The OpenRAN module is in communication with modules for SON and analytics, and for OpenRAN controller and network software that is in communication with one or more core networks.

Parallel Wireless's 2G/3G/4G/5G OpenRAN and Network software platform enables openness through the complete decoupling of hardware and software functionality. This functional separation enables the software to support all the different protocol splits between DUs and CUs based on available backhaul/fronthaul options. In addition it provides:

Network Orchestration and real-time SON: the software platform also provides complete RAN orchestration including self-configuration, self-optimization, and self-healing. All new radio units are self-configured by the software, reducing the need for manual intervention. The self-optimization is responsible for necessary optimization related tasks across different RANs, utilizing available RAN data from the Analytics module. The predictive approach utilized by the Parallel Wireless platform, in contrast to the legacy reactive optimization approach, improves user experience and increases network resource utilization.

Edge Core: a virtualized core solution consisting of MME, SGW and PGW as well as AMF, SMF, UPF and N3IWF, or any combination of these, deployed as Virtual Network Functions (NFV). Its scalable architecture allows flexible deployments, from small-footprint cost-efficient Packet Core from a few thousand to millions of subscribers.

Neutral hosting enabler: it enables MOCN/MORAN by having the ability to view the traffic and route to the proper core. This then allows RAN sharing to happen without complication to any of the home networks, the software module simply requires connections to each core and handles the heavy lifting of routing of the traffic properly.

Being a 5G-native platform, it will provide a smooth migration path to 5G utilizing any migration option.

Benefits to MNOs

Easy and cost-effective installation. With the Parallel Wireless OpenRAN controller, deployment can be reduced from days to hours, while eliminating the need for RF planning and extensive system integration. In under a day, a Tier 1 was able to install the whole system in a medium-size enterprise building, without specialized installers or RF planning required. The controller configured the nodes without any involvement from IT personnel (plug-and-play). The Parallel Wireless solution offered comprehensive self-organizing network (SON) capability, ensuring that cells were self-configuring (including neighbor lists and physical cell ID).

Quality end-user experience, including voice. The network orchestrator functionality of Parallel Wireless software platform also optimizes radio performance, e.g., inter-cell interference coordination, handover optimization between the indoor cells and indoor cells and neighboring macros for seamless mobility, and frequent handover mitigation, which results in better QoS for data and voice for end users. The dual-mode cell supports Circuit Switched Fallback (CSFB) and VoLTE voice, enabling the operator to invest in the future while ensuring it can deliver the legacy services for high-quality voice coverage.

5G OpenRAN 5G radio, or NR (New Radio), improves spectral efficiency and delivers unprecedented network capacity. 5G New Radio technology is based on flexible OFDM waveforms and multiple access techniques, optimized for various 5G services, applications, and deployment use cases. 5G (NR) features are defined by various 3GPP standards, with first phase completion in Rel-15 and second phase in Rel-16.

The Parallel Wireless OpenRAN software suite for 5G(NR) increases spectrum efficiency, traffic capacity, throughput, reliability, number of connected devices and reduces end-to-end latency. This technology enables MNOs to unlock and support diverse use cases such as Fixed Wireless Access (FWA), Enhanced Mobile broadband (eMBB), Massive Machine Type Communications (mMTC), and Ultra-Reliable Low Latency Communications (URLLC). Parallel Wireless OpenRAN outdoor hardware is software-upgradable to 5G, delivering these enhanced capabilities at much lower cost.

The need to provide both coverage and capacity while supporting growing data consumption, all with declining ARPUs, have placed tremendous pressure on MNOs to find the most efficient use of their allocated radio spectrum.

Our outdoor OpenRAN solution helps with spectrum optimization to make mobile operators profitable. The architecture consists of an OpenRAN Controller orchestrating:

Virtualized Baseband Unit (vBBU): Based on Intel-based COTS (x86) hardware, this component provides High-PHY, MAC, RLC and PDCP functionality in a central fashion. It communicates to a cluster of RRHs (which contain RF and lower PHY) and supports multiple carriers based on the RRH cluster's load. The interface between vRU and RRH is based on Ethernet-based eCPRI. This architecture supports 4G today and is software-upgradable to 5G.

Remote radio heads (RRH): The Parallel Wireless solution incorporates standard, off-the-shelf RRHs and small cells from different OEMs. These OpenRAN RRHs and small cells can be integrated into our solution with minimum integration effort, reducing the overall cost of ownership for mobile operators.

Parallel Wireless has developed extensive OpenRAN partnerships for macros, small cells and Massive MIMOs to support all use cases for coverage and capacity.

Macros and Massive MIMO

Figure 3:
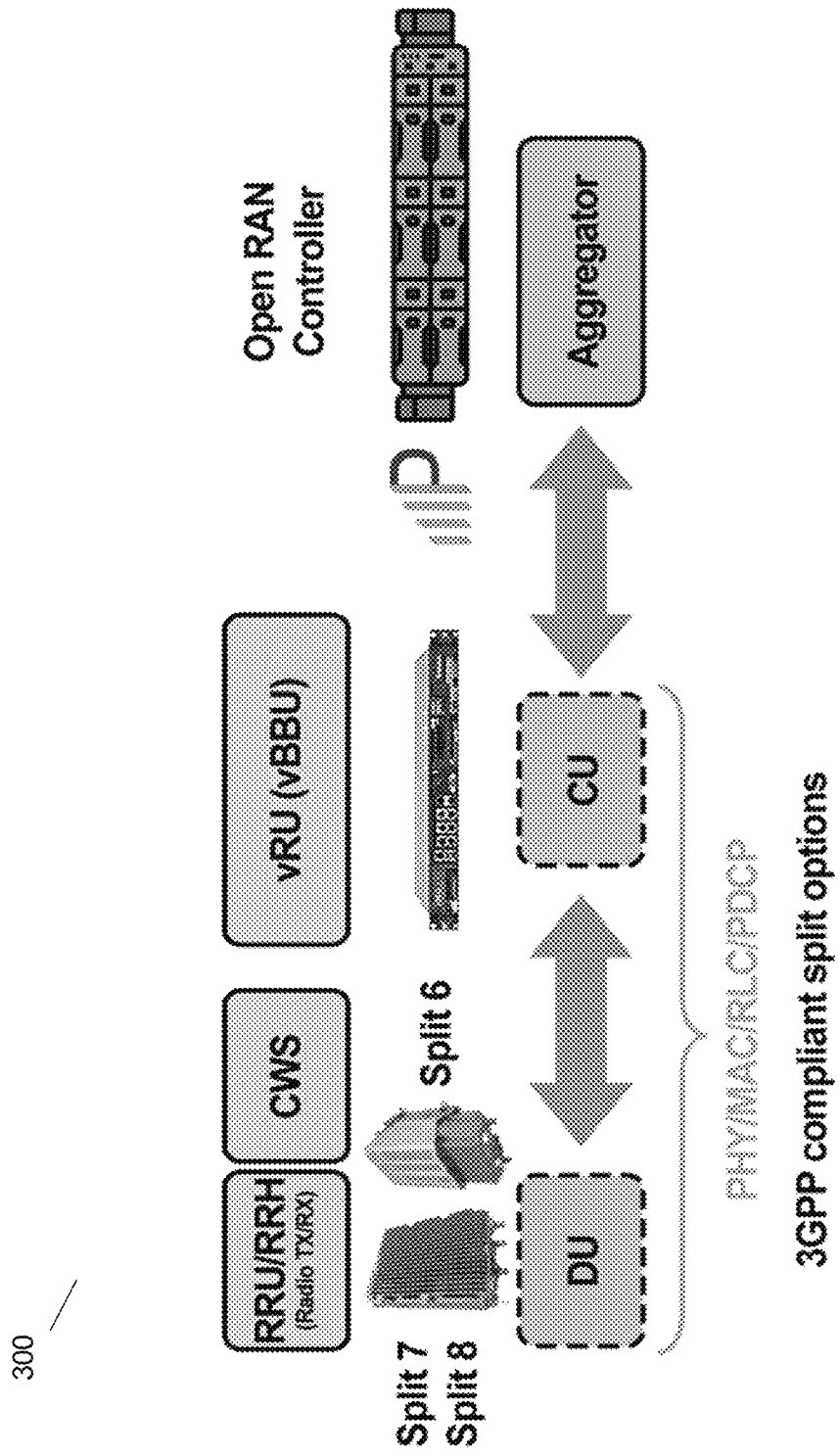
FIG. 3 is a diagram showing 3GPP compliant split options, in accordance with some embodiments.

FIG. 3 is a diagram showing 3GPP compliant split options 300, in accordance with some embodiments.

When operators build a network, they typically start by building a macro layer, mainly consisting of rooftop sites and towers to quickly deliver the largest possible coverage area. Parallel Wireless has an ecosystem of OpenRAN hardware to deliver the most efficient and powerful solutions to deliver coverage and capacity from 2×2 to 4×4 in different frequency bands—all software-defined and easily upgradable to 5G.

Moving from MIMO to massive MIMO, according to IEEE, involves making "a clean break with current practice," as it requires a large number of service antennas over active terminals, as well as time-division duplex operation. " . . . By focusing energy into ever smaller regions of space, [Massive MIMO brings] huge improvements in throughput and radiated energy efficiency." The group calls out other benefits including cheaper parts, lower latency, simplification of the MAC layer, and robustness against intentional jamming.

However, M-MIMO presents deployment challenges as well:

Heavier antennas, meaning that existing poles may not be able to bear the load, and any upgrades required will necessitate additional deployment costs Power upgrades, as new active antennas will consume more power, which will be an additional operational cost as well as capital cost Backhaul upgrades, as existing backhaul may not be able to cope with the projected massive increase in data traffic With Parallel Wireless and its massive MIMO ecosystem partners, MNOs can select hardware based on their 5G deployment cases, budget and subscriber needs. Our Open-RAN Massive MIMO delivers:

A compact solution with perfect component synchronization that is easy to deploy Support for any deployment scenario Internal power consumption reduction to achieve total energy efficiency reductions.

Small Cells for Densification 5G networks will push the limits for small cell deployments. The Parallel Wireless OpenRAN approach solves the triple challenge of interference, mobility and deployment:

A combination of intra- and inter-frequency underlay and overlay cells will be a common practice in 5G networks. In a spatial densification deployment, the OpenRAN Controller manages intra-cell interferences, and for a vertical densification deployment it will coordinate all load-related handoffs and other functionalities to utilize different layers accordingly, thus improving overall system performance and frequency utilization.

The split concept (DU and CU) for 5G facilitates a simpler approach toward frequency coordination among different cells in a geographical area. This approach to small cell deployments enables different DUs with the same or different operating frequencies to be connected and coordinated through a single CU (Parallel Wireless vCU as a VNF in OpenRAN software suite).

All these interference mitigation techniques require tight coordination among different RRHs. Parallel Wireless SON coordinates with connected small cells directly, and also provides all required signaling to macro cells and reduces the overall system control signaling.

Besides interference issues, the densification of cellular networks can impact user experience due to increases in handoffs and related signaling loads. The increase of handoffs in a mobile system can directly impact the volume of signaling in the system and have a negative impact on overall user experience and system capacity. The Parallel Wireless OpenRAN controller dynamically executes parameter changes to optimize the user experience based on their mobility.

FIG. 3 shows various 3GPP compliant split options. The OpenRAN controller acts as an aggregator for all available splits, as it operates in the core, and can work with any CU/DU split and can coordinate all active antennas.

Unified fully virtualized architecture across all Gsàopen interoperability through the GPP-based baseband processing platform, radio hardware, software and simplified business model to support ALL G OpenRAN controller to automate optimization with real-time SON 5G-ready: delivering benefits of 5G to ALL Gs (i.e. latency, network slicing, orchestration Virtualizes ALL G RAN and core functions (i.e. vBSC for 2G, vRNC for 3G, small cell and core gateways for 4G) on COTS, with ORAN architecture In some embodiments, OpenRAN Controller module includes DU/CU, and/or interworking among radio management interfaces for different vendor radios, and/or between handset and radio. Enabling SON/analytics/controller etc. for all vendor radios. Done using interworking among vendor interfaces at the aggregator.

Aggregator sits further in the core from CU.

OpenRAN Software Suite

Figure 4:
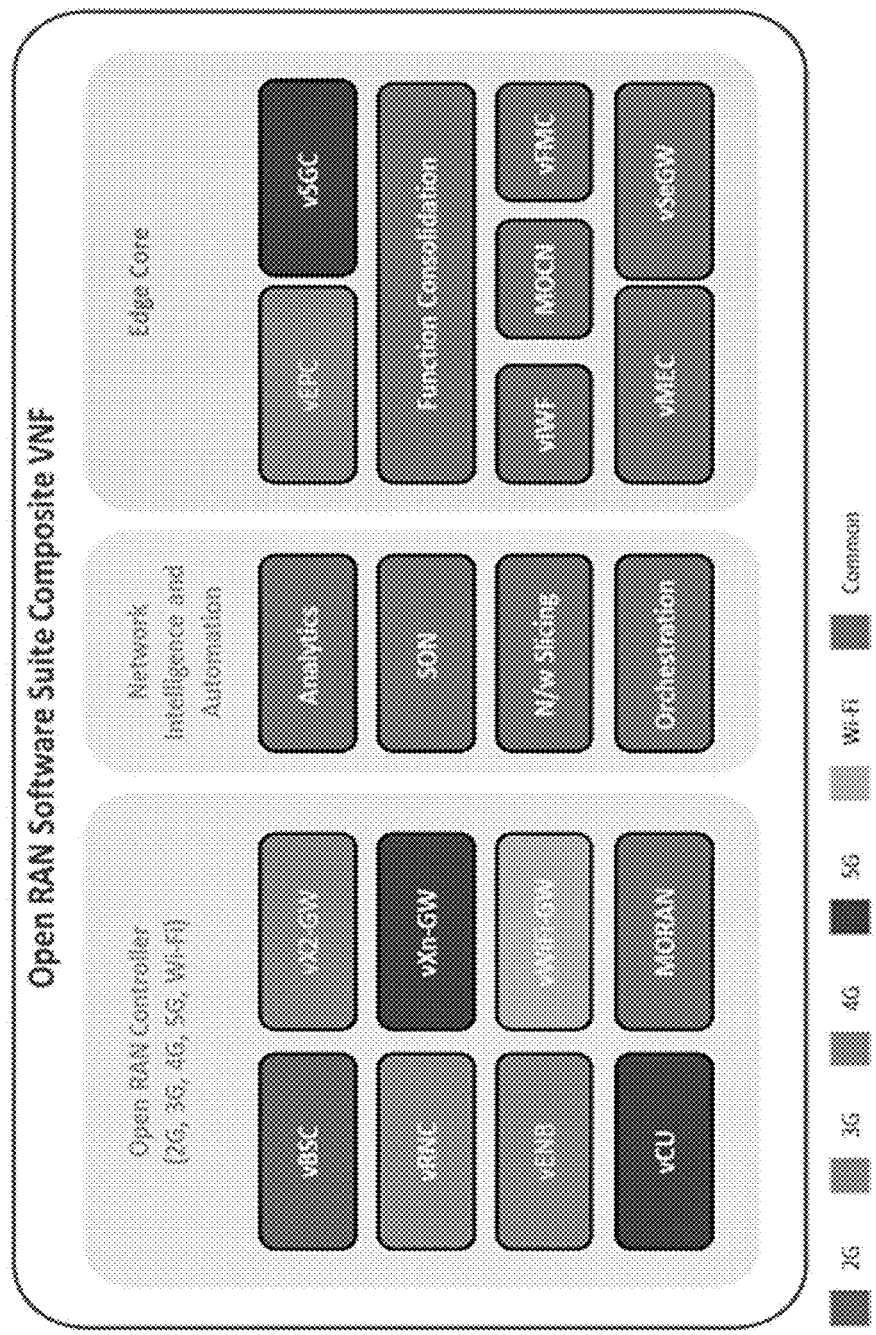
FIG. 4 is a diagram showing an OpenRAN software suite, in accordance with some embodiments.

The Parallel Wireless OpenRAN software suite enables the complete decoupling of hardware and software functionality. This functional separation enables the software suite to support any protocol split between DUs and CUs based on available backhaul/fronthaul options. Different RAN element functionalities are also consolidated on the platform, reducing complexity and making overall network maintenance simpler and less resource-intensive. Running on COTS x86-64 servers with minimum hardware dependencies, our world's first and only OpenRAN software suite consists of the following components:

FIG. 4 is a diagram showing an OpenRAN software suite, in accordance with some embodiments.

OpenRAN Controller: This performs the functions of an OpenRAN controller and is responsible for radio connection management, mobility management, QoS management, edge services, and interference management for the end user experience. Different RAN element functionalities are consolidated on this software platform, reducing complexity and making overall network maintenance simpler and less resource-intensive. As currently released, the OpenRAN controller module can virtualize a vBSC/2G gateway, 3G gateway/vRNC, 4G gateway/X2 gateway, Wi-Fi gateway, or any combination thereof. The fully virtualized and scalable controller functionality supports the E2 interface and works with multi-vendor RAN. As a result, it helps create a multi-vendor, open ecosystem of interoperable components for the various RAN elements and vendors. It can be software-upgraded to 5G RAN Controller functionality as non-standalone (NSA) and Standalone (SA) as the 5G standards are finalized and stabilized. Being a 5G native platform, it provides a smooth migration path to 5G utilizing any migration option. The 5G RAN Controller is ideal for mixing active antennas with passive antennas, including adding MU-MIMO and other advanced technologies to an existing network. Although certain new technologies may require upgrades in the core network, as well as new RF and active antenna technology, the 5G OpenRAN Controller allows these upgrades to be transparent and interoperable with respect to the existing network, so that, for example, new 5G RAN active antennas may use 4GC until 5GC is made available or until the 5G OpenRAN Controller is provisioned with 5GC capability.

Network Orchestration and real-time SON: This provides complete RAN orchestration, including self-configuration, self-optimization, and self-healing. All new radio units are self-configured by the software, reducing the need for manual intervention, which will be key for 5G deployments of Massive MIMO and small cells for densification. The self-optimization is responsible for necessary optimization related tasks across different RANs, utilizing available RAN data from all RAN types (macros, Massive MIMO, small cells) from the Analytics module. The predictive approach utilized by the Parallel Wireless platform, in contrast to the legacy reactive optimization approach, improves user experience and increases network resource utilization, key for consistent experience on data intensive 5G networks.

Network Sharing enabler: Infrastructure sharing will be a key for 5G networks. Parallel Wireless OpenRAN software suite enables MOCN/MORAN by having the ability to view the traffic and route to the proper core. This then allows RAN sharing to happen without complication to any of the home networks. The HetNet Gateway simply requires connections to each core and thereafter handles the heavy lifting of routing the traffic properly.

Benefits to MNOs

By disaggregating hardware and software, the Parallel Wireless OpenRAN software platform creates a unified architecture through abstraction of traditional RAN and core network functions on a COTS server, and brings 5G software benefits (i.e. low latency and network slicing) across the network for ALL G (2G/3G/4G/5G), resulting in:

G Agility: a unified software-enabled architecture for past, present, and future Gs Deployment flexibility for 5G, 4G, 4G, 2G through consolidation of network functions and RAN/core interfaces Openness across RAN and core through fully 3GPPP compliant virtualized interfaces, enabling interop between all vendors and allowing for modernization of networks or selection of best of breed for 5G Real-time responsiveness to subscriber needs through edge-centric architecture to deliver best performance for voice and data, outdoors or indoors, across 2G/3G/4G/5G, thereby reducing subscriber churn.

OPEX reduction through network automation: with plug-n-play configuration and hands-free optimization, professional services spend on deployment or maintenance is reduced by up to 80% to deliver much lower OPEX across past, present, and future networks, even 5G networks.

The Parallel Wireless OpenRAN software suite is fully virtualized. It can be deployed as a VNF (it is a Composite VNF, which includes a federation of VMs behaving like a single logical entity). The software is ETSI's MANO compliant, and agnostic to the underlying data center infrastructure so can use any Intel x86 server, and can be installed with all major market leading hypervisors (Linux KVM, VMware ESXi). It can be managed via any standards-compliant VNF Manager (VNFM), as well as any NFV Orchestrator (NFVO). Partnerships are in place with Intel, RedHat, VMware, HPE, and Dell. SRIOV, DPDK, PCI Passthrough is fully supported.

Solutions 5G networks will have to support a number of services, many of them with different and almost orthogonal performance requirements.

Three major service categories defined for 5G are:

Enhanced Mobile Broadband (eMBB): This has been billed as the main driver for initial 5G rollouts. Not only are end users expecting to receive faster speeds, they expect more data allowances for a lower price. 5G meets end-user expectations while delivering spectral efficiency for the operator. The Parallel Wireless OpenRAN software suite plays an important role here by abstracting core functionality and catering for different deployment options, based on the SP's roadmap.

Massive Machine Type Communications (mMTC): LTE-M and NB-IoT, standardized as part of 3GPP Release-13 version of LTE, are being enhanced to work with 5G. There is no special focus for mMTC in 5G currently but this will play an important role in the 3GPP Release-16 version of 5G. The Parallel Wireless software suite will help to manage the myriad of IoT devices and mitigate interference and reduce signaling strain on the core.

Ultra-Reliable and Low-Latency Communications (URLLC): This feature promises to make 5G appealing to many new verticals, thereby providing SPs with new source of revenues. There is no focus for URLLC in 5G currently but it will play an important role in 3GPP Release-16 version of 5G. This feature also requires 5GC, as new slices would need to be created for different verticals to meet their requirements.

In addition to the above use cases, fixed wireless access (FWA) has also emerged as an important use case for quite a few operators. While there are no special features that have been added specifically for FWA, features such as 3D beamforming and wider bandwidths make 5G an attractive option for FWA. Parallel Wireless OpenRAN is increasingly being deployed not only provide mobile broadband services but also for fixed wireless deployments using 4G LTE. It is foreseen that this trend will continue with 5G.

With Parallel Wireless OpenRAN architecture, MNOs can:

Deploy 5G networks with 5G-native architecture

The Parallel Wireless OpenRAN architecture is software-based, so it is inherently 5G-native, and a network could be switched to 5G when standards are finalized with a simple software upgrade, maximizing the original 4G investment on the RAN or core.

Figure 5:
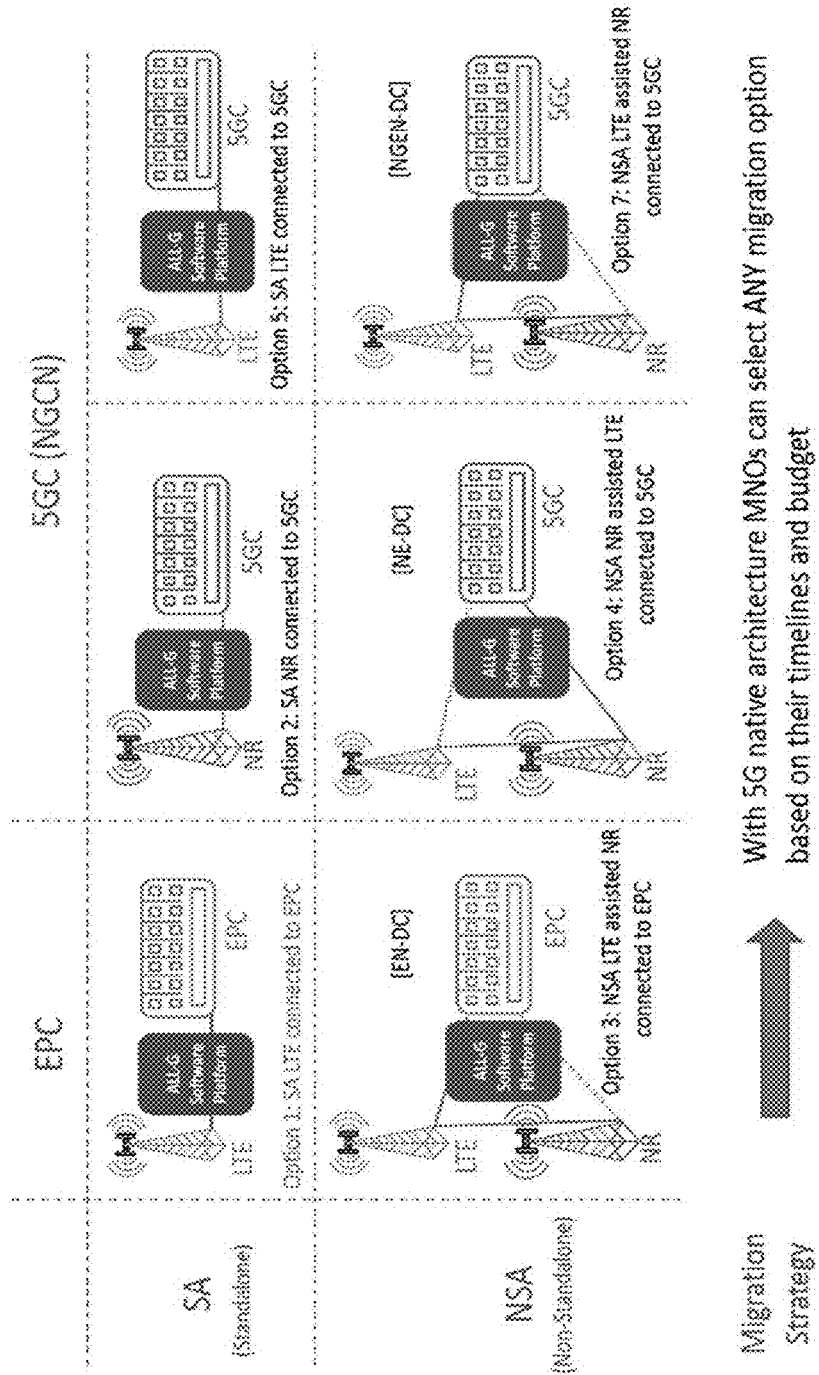
FIG. 5 is a diagram showing a migration strategy with a 5G native architecture, in accordance with some embodiments.

FIG. 5 is a diagram showing a migration strategy with a 5G native architecture 500, in accordance with some embodiments.

Simplify 5G and reduce deployment cost through 5G OpenRAN

The orchestration and real-time SON capabilities provide real-time optimization and network automation reducing the maintenance cost and enabling new business cases for 5G. In addition, spectrum sharing, network sharing can be enabled through MORAN and MOCN functionality to maximize spectrum and reduce 5G deployment cost.

Deliver 5G experiences for consumers and industries

With features of Parallel Wireless's OpenRAN architecture, the introduction of network slicing and control and user plane separation (CUPS) on any 5G NSA core supports 5G design architectures.

The OpenRAN software suite manages each slice, delivering the required QoS, security, latency characteristics.

Figure 6:
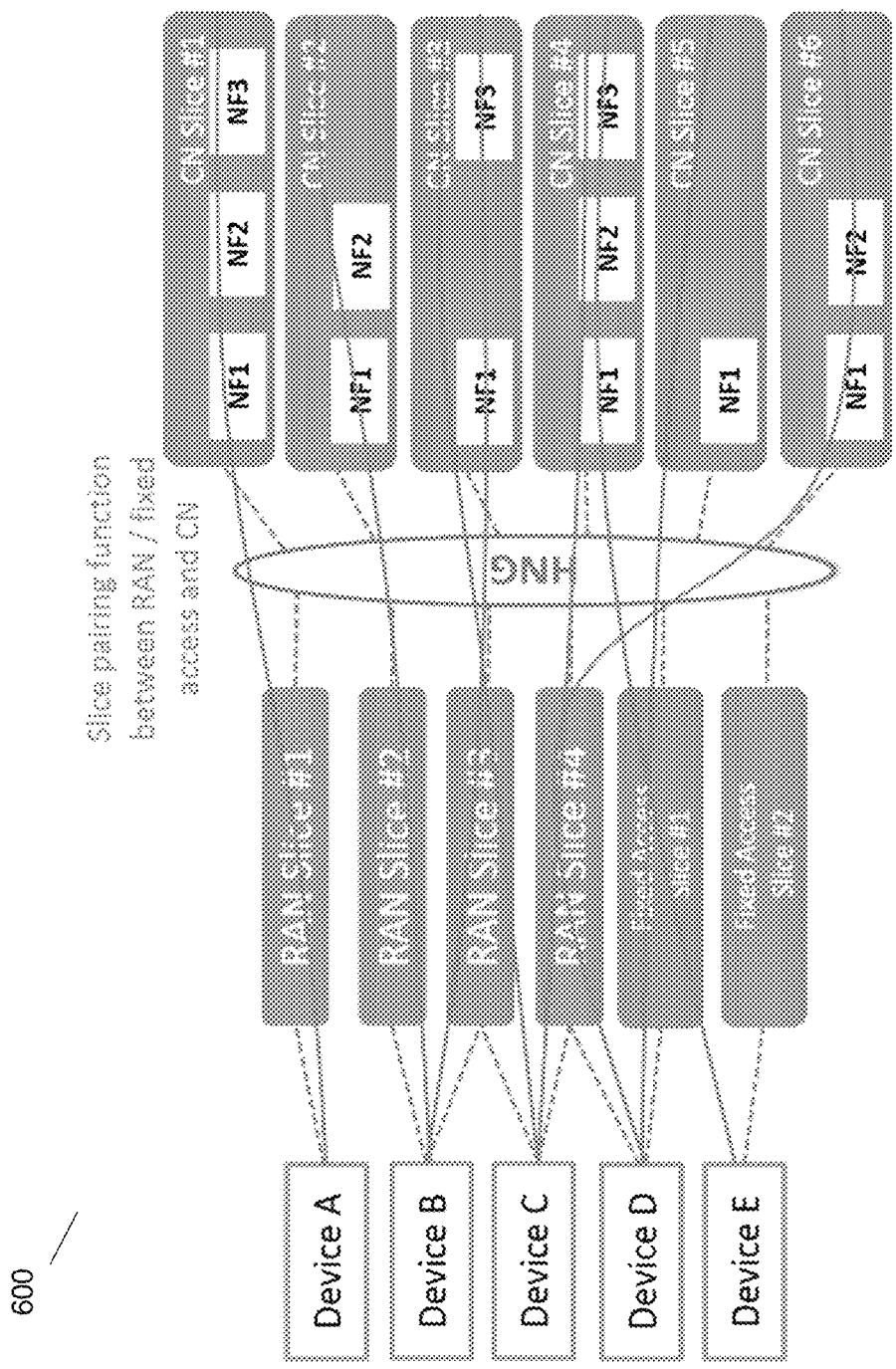
FIG. 6 is a diagram showing network slicing, in accordance with some embodiments.

FIG. 6 is a diagram showing network slicing 600, in accordance with some embodiments.

In addition, it will deliver dynamic capacity and throughput for optimal performance for 5G data intensive applications through scalable software-based architecture.

Coverage

Enhanced mobile broadband will be the first commercial application of 5G and can help operators deliver coverage everywhere from rural to suburban to most dense urban locations. Parallel Wireless OpenRAN can support all those deployment scenarios at the lowest TCO and can be deployed on accelerated timeline.

Figure 7:
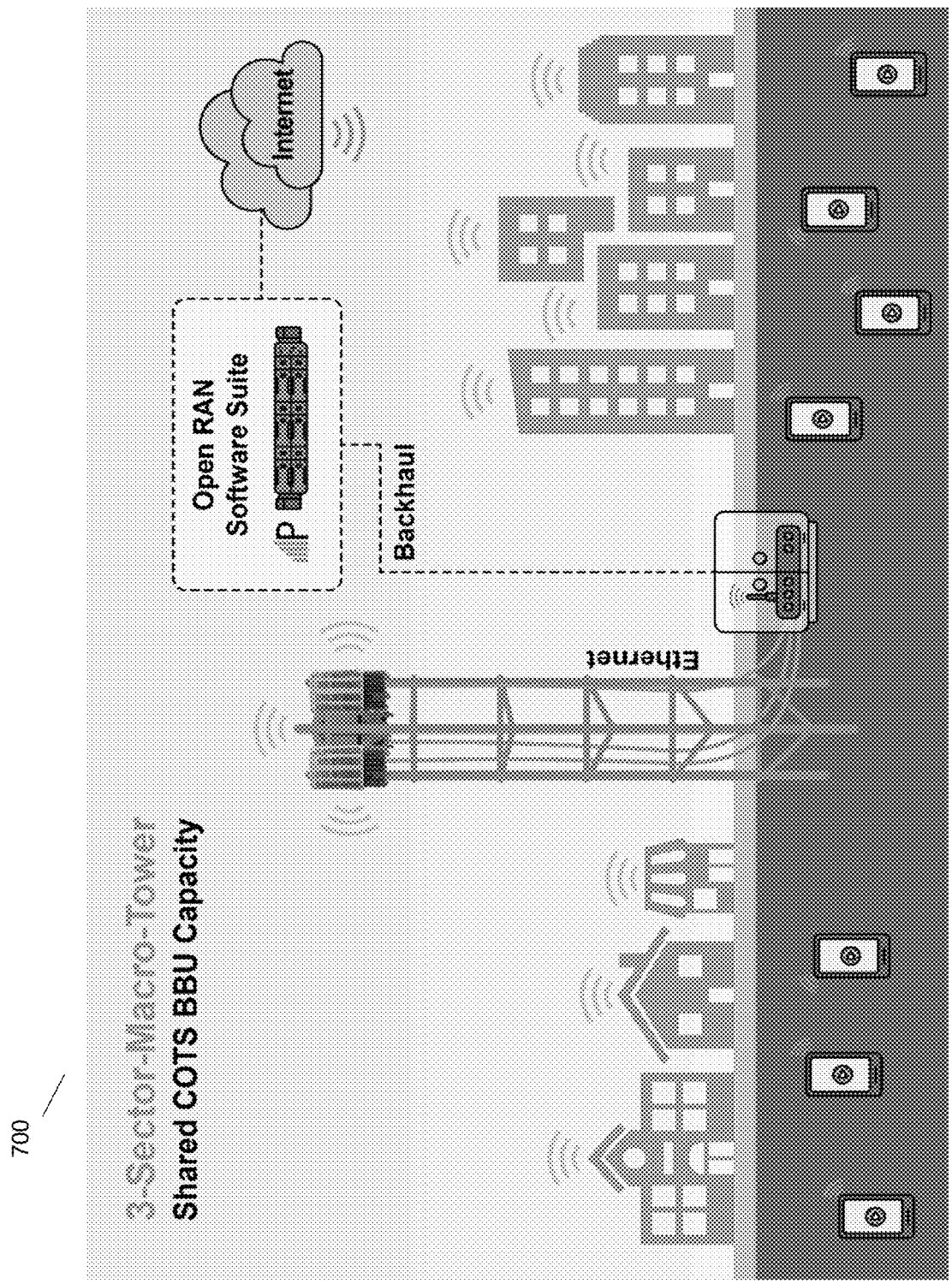
FIG. 7 is a diagram showing a 3 sector macro tower with shared COTS BBU capacity, in accordance with some embodiments.

FIG. 7 is a diagram showing a 3 sector macro tower with shared COTS BBU capacity 700, in accordance with some embodiments.

Capacity

Figure 8:
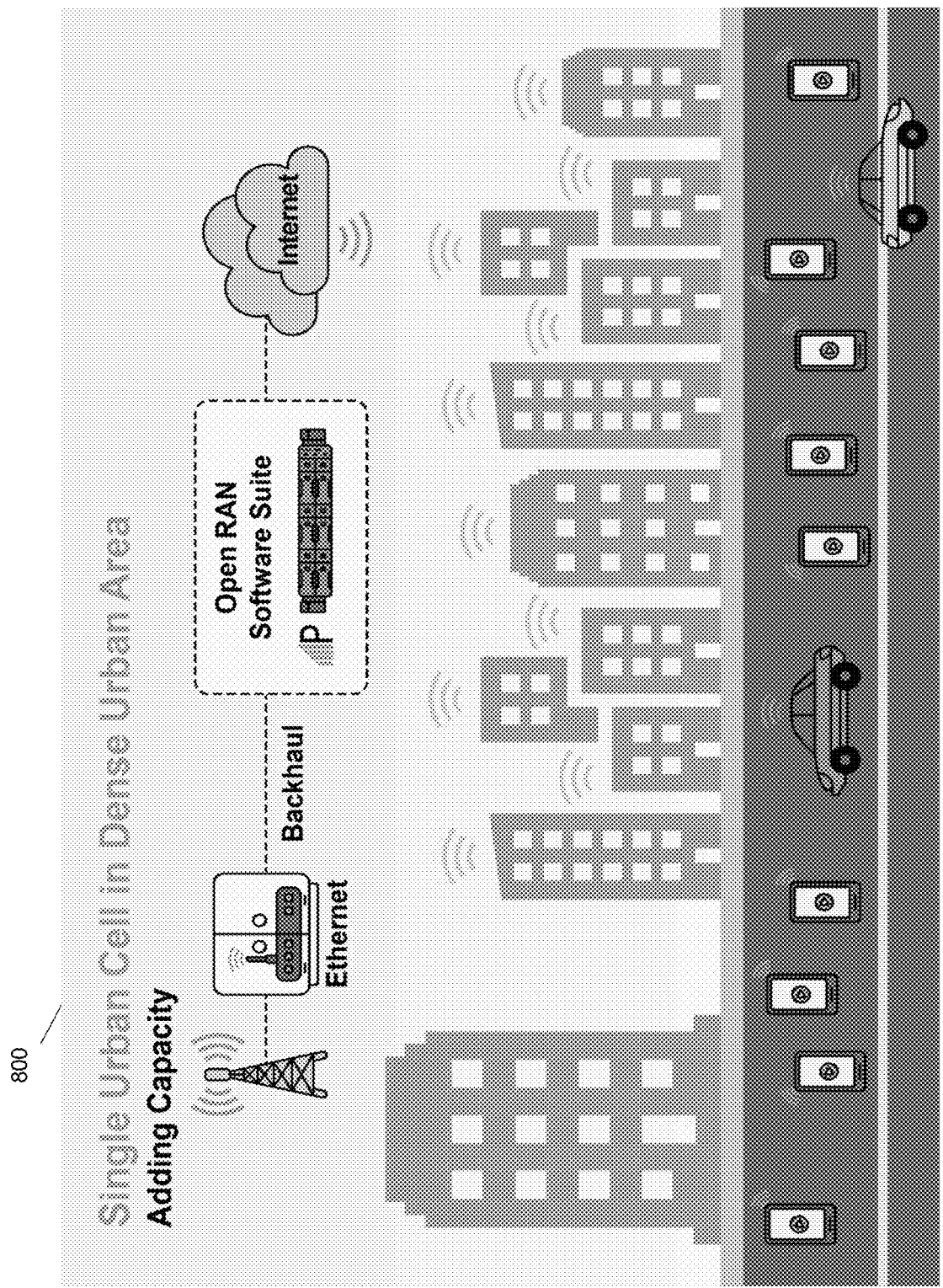
FIG. 8 is a diagram showing a single urban cell in a dense urban area, in accordance with some embodiments.

FIG. 8 is a diagram showing a single urban cell in a dense urban area 800, in accordance with some embodiments.

As MNOs deploy 5G networks, how people connect in urban areas will drive solutions that operators will deploy. Easy to install, low-cost and high-performing cloud-native Parallel Wireless OpenRAN supports macro or small cell deployments for densification and delivers superior end user QoS for consumers and industries.

Customer MNO Challenge

ECONOMICS: cost to deploy and maintain network for coverage or capacity which will skyrocket w/5G deployments. Analysts project deployment cost of a 5G macro cell, shows pricing will fall by 50% from now until 2022 if it is built around an open architecture, whereas it will only fall 30% if it is built in the traditional way. The 20% difference is hundreds of millions and will drive the overall TCO down.

VENDOR DIVERSITY AND INNOVATION: In the past, MNOs bid out their RAN every 3 years in an attempt to save 30%. They bid with current and new vendors—this drove the price down, but they had to rip and replace. And then repeat again in 3 years. With OpenRAN, the bidding will be only around sw, no need to replace the hw on site. This will result in overall much lower TCO 5G will be an expensive lock in with the same old vendor (unless it's Open) and 2. unless modernized and unified there will be three to four Gs to maintain on their networks).

END USER EXPECTATIONS: end users want more and will jump the ship if cost doesn't match the experience they're expecting.

PW is the world's only wireless infrastructure company that helps global MNOs to reimagine how their wireless networks are built and deliver substantial cost savings with our leading OpenRAN solutions.

Positioning

Segment: global MNOs

Unified, cloud native, software-defined architecture across RAN, transport, and Core to reduce cost and deployment complexity for today's and tomorrow's network deployments for consumers and industries.

Solving economics dilemma: by reducing hw cost, CAPEX can be reduces—even 20% of reduction will deliver millions of dollars, especially for 5G deployments. Network automation helps with deployment cost and on-going maintenance cost.

Cloud native, unified, intelligent and secure across RAN, transport and Core for ALL G (2G, 3G, 4G, 5G); software upgrade to 5G delivers investment protection; while other companies rip and replace which costs money.

Segment: MNOs that are open to "think different" and are ready to change the way they build and operate networks.

Solving Interoperability: legacy vendors that not only do not interop w/newer vendors or each other but cannot interop with their own previous Gs (run as siloes). Unless MNOs deploy new technologies, 5G deployments will repeat deployments for 3G, 4G when they will get locked with one vendor costing them $$$. Analysts predict that legacy vendors due to siloed and non-interoperable costing a lot in OPEX which is much higher than initial CAPEX. Will get even worse with 5GPW software is interoperability layer (OpenRAN).

Interoperable enabled by the world's first OpenRAN controller with any vendor or any G allowing selection of multi-vendor systems for 5G.

Target 1: Global MNOs looking to reduce deployment cost of 2G/3G/4G.

Positioning for Target 1: OpenRAN message: by disaggregating hw and sw an virtualizing network functions on OpenRAN controller, deployment cost is reduced and maintenance is simplified.

Solving capacity demands of the end users (i.e. cost effective Massive MIMO) and providing differentiated experience enabled by sw (i.e. Private LTE).

Enables new operating models that reduces cost (MOCN/sharing first, OPENRAN) as it delivers new value for the customers (Private LTE with network slicing, e etc.).

Target 2: Global MNOs looking for high end innovative cloud native 4G and 5G solutions that will meet 5G economics.

Positioning for Target 2: 5G starts here. Looking for solutions that help to meet 5G economics (i.e. Massive MIMO cost, network slicing, RAN and Core sharing). 5G OpenRAN.

Result: unified architecture across All G, software upgradable to 5G, lowest TCO.

Help global MNOs to change the world by helping them reimagine their networks—through PW's world's only unified ALL G cloud-native OpenRAN architecture and world's first and largest OpenRAN ecosystem.

Reimagine your network. Reimagine Your Economics.

Innovative, disruptive, human, credible.

Fully virtualized/cloud native open and horizontally distributed software-based OpenRAN architecture across ALL Gs.

Softwarization

Disaggregation of hw and sw puts sw in the center of network and delivers elastic scalability across all network components from access, transport to the core enabling Access, transport and core run as apps and services not vertical silos. OpenRAN for ALL G including 5G with largest OpenRAN hardware portfolio for outdoor and indoor coverage and capacity enabled by OpenRAN Controller.

The software enabled approach delivers unprecedented opportunities to reduce complexity and drive out cost from every aspect of the network (RAN and core) This hw agnostic approach results in RAN and Core Openness enabling multi-vendor deployments and also futureproofs for any future G with just a remote sw upgrade.

Openness

Network openness across all components, for ALL G, not just 4G or 5G—ability to select any vendor for hw. OpenRAN Controller enables that.

Significantly improves network economics by converging 'ALL G', including 2G, 3G, 4G, 5G, on to one unified software platform. This eliminates the need for operators to maintain siloed legacy networks dedicated to just one G service resulting in up to 60% maintenance cost reduction. Allows to modernize legacy networks for cost reduction will be essential to reduce the complexity and integration expense of rolling out multivendor 5G systems.

Edgification (Edge)

With local breakout; low latency deliver these benefits to all G networks with Edge Core and OpenRAN Controller.

The concept of open goes beyond just standards interoperability. In theory, a RAN built by Nokia, Ericsson or Huawei is interoperable with any device, any core, any transmission network due to its conformance with 3GPP standards. But the software and interfaces remain either proprietary or optimized by the individual vendor and are often tied to the underlying hardware layer by the same vendor. The vision of the OpenRAN by Parallel Wireless is that it is open within the RAN, with the interfaces and operating software separating the RAN control plane from the user plane, building a modular base station software stack that operates on common-off-the-shelf (COTS) hardware, with open north- and south-bound interface. This software-enabled architecture enables a "white box" RAN Hardware meaning that baseband units, radio units and remote radio heads can be assembled from any vendor and plugged together to form a truly interoperable and open network.

The resulting cost benefits are huge. It offers a negotiating position—a viable "other" to the current vendor pricing model. And it is reducing dedicated hardware cost. Open source designs for the radio software minimizes costs still further.

However, the technical consequences are also sizeable. Radio network processing is intensive, real time, and complex. It has relied on the optimized software and hardware capabilities—working in tandem—of specialist vendors. But to save the cost and to reduce operational complexity, operators are trusting white box RAN from PW and IT servers running HetNet software.

Cloud Native

Software-based unified architecture (openRAN) that is purpose built for the cloud model across all G, not just 4G or 5G. This is a software platform that offers easy scale-out and hardware decoupling (openRAN)—to provide MNOos with greater agility, resilience, and portability across cloud environments for greater TCO savings.

With pw real-time SON, operators can deploy in the matter of hours instead of days without using complex planning tools. SON will also enable self-optimization of the networks reducing the need to go on site resulting in up to 60% cost-savings and will enable self-healing—both combined will provide optimized experience to end users and industries. Analytics will provide real-time intelligence through insights into networks operations and drive efficiency and network performance.

Intelligent Automation

Real-time visibility into the network and big data to enable intelligent network improvement or optimization decisions in real-time. Automation delivers zero touch deployments and makes networks programmable.

Brings real-time, high-bandwidth, low-latency access to latency-dependent applications (connected cars, IoT, rural, enterprises. Edge processing is key to massive IoT deployments and as crucial for analyzing large amounts of data coming from increasingly connected things. Industries benefit from edge computing where services are delivered from an edge server. The content is locally stored, processed, and delivered—not requiring a backhaul or centralized core network.

Agility

Agility through sw delivers 1. Fast network deployments. 2. No Capacity/Coverage Limits. Disaggregation of hw and sw allows abundance of capacity at much lower cost including Massive MIMOs and 5G NRs—they will be lighter, consume less power, will be easy to deploy and maintain through automation.

Deployments happen within days, not months—deployed by low skill labor crew. Additional capacity can be added easily, upgrades are remote with simple software upgrades.

Creating New Business Opportunities

By bringing 4G and 5G capabilities like low latency, network slicing, ran and core sharing, MNOs can provide differentiated services to their 2G/3G/4G/5G end users and verticals resulting in new revenue opportunities and faster return on the investment.

There are also risks seen by some operators of partnering with an immature and fragmented open solution.

TCO Reduction

60% CAPEX REDUCTION. 65% OPEX REDUCTION

Software Innovation and openness (sw and hw disaggregation and COTS) and network automation drives TCO reduction Credibility Deployed for network modernization, coverage and 5G across six continents with over 60 global MNO's networks.

Software Defined (Open) vRAN

Outdoor and Indoor RAN products (CWS, RRH, CAP), BBU for capacity; 5G OpenRAN. DU CU separation/RAN splits.

Disaggregation of hardware and software along with decoupling of CU/DU functionality and support of any 3GPP compliant split. SDR radio that can be software upgraded to any G, including 5G for ease of deployment and lower cost (no rip and replace). Flexible and programmable architecture. Separating RAN hardware and software, using commoditized GPP-based hardware creates an Open ecosystem to drive cost down as a part of an end-to-end solution especially for multi-vendor 5G deployments. Software based approach delivers ultra-high capacity access, no capacity or coverage limits as resources can be extended cost-effectively. Brings an Open ecosystem for 5G (most capable 5G OpenRAN). vCU at the edge cloud brings in intelligence and optimization for MEC.

RAN Controller

Industry's first and most innovative OpenRAN controller. Supports E2 interface and works with multi-vendor RAN. Fully virtualized and scalable infrastructure. Enables radio and network optimization and analytics. orchestrates indoor or outdoor RAN products.

Edge Centric

Edge Core

Edge centric architecture is a key to low latency. MNOs can deliver 5G like low latency across ALL G networks to enable end user QoS. Also enable MEC via edge core for low latency applications. Control and user plane separation is enabled via 4G and 5G packet core data plane functions running at the edge.

Network Software 5G starts here

Interoperable

World's First fully compliant virtualized OpenRAN Controller (MC) across 5G 4G 3G 2G and Wi-Fi.

NFV-based, innovative fully virtualized functionality for: Innovation Virtualization vBSC, vRNC, x2 GW, ePDG/TWAG functionality. Enables orchestration of multi-vendor RAN systems—key for 5G. Allows network modernization of legacy 2G and 3G systems for cost savings. Helps with 4G expansion. Responsible for Radio connection management, mobility management, QoS management, edge services and interference management for the end user experience. Helps create a multivendor, open ecosystem of interoperable components for the various RAN elements and vendors.

2G

The Parallel Wireless GSM Radio Access Network solution consists in a complete Base Station Subsystem, ready to be interfaced to MSC & SGSN of existing networks or any greenfield deployments. Both the Abis and A interface could be implemented over IP or E1/T1, which simplifies local connectivity, provides flexibility in deployments, and makes it easy to carry traffic over various types of backhaul. The additional technical features include:

Fully virtualized 2G solution that not only virtualizes 2G including vBSC but simplifies legacy 2F architecture with improved performance on high latency backhaul links (i.e satellite) and improved voice quality with RTP localization feature (Lawful Intercept enabled).

2G solution that provides MUCH larger coverage area with much Higher RF output and is easy to deploy and maintain as it is fully automated though OpenRAN software SON module.

Easy and cost-effective upgradability to future Gs as it's the only RAN solution with no forklift upgrade from 2G to 3G to 4G and 5G as the same BTS can support 2G, 3G, 4G at the same time (2+ technologies within the same band), no need to buy additional equipment once ready to provide 3G or 4G and the software provides 3G, 4G, Wi-Fi support and is 5G-ready.

Flexible backhaul options, including low-cost wireless mesh, satellite, microwave Scalable with tens of thousands of sites can be supported and MOCN and RAN sharing enabled.

The OpenRAN and Network Software Suite makes the OpenRAN hardware self-configurable, self-optimizing and self-healing via real-time Self Organizing Network (SON) functions. It also provides resilience and self-healing and comes with intelligent power management that monitors and manages the radios to ensure that neighboring networks are not negatively impacted. All this makes it ideal for deployment using a variety of power options. This helps with the overall network performance towards a higher customer Quality of Experience (QoS). The software can run on any COTS server, including mini-servers and can be deployed in the cloud or local. Local deployments along with a local core can provide additional level of resilience. To ensure the limited backhaul available doesn't limit end user experience, the software suite can enable MEC for local communities—so educational applications like schoolwork can be cached. With local breakout, the software ensures that data can be offloaded from operator's network, again, making sure that any available bandwidth is not consumed by traffic that can be localized or offloaded.

It also supports active-active model towards MSC and SGSN to provide additional resiliency in case of network outages or failures.

Deployment Benefits

The Parallel Wireless fully virtualized 2G solution delivers the following business benefits to global mobile operators:

Lowest TCO for dual-mode 2G/3G/4G/5G or single mode solution as it provides vBSC via the software that can support tens of thousands of cells (reducing cost since 1 BSC can cover multiple sites).

Lowest Site CAPEX with an easy plug-n-play install with SON. Innovative OpenRAN hardware doesn't require cooling, requires fewer solar panels or batteries, reducing overall site cost. It can be installed on poles or existing and exposed structures due to lighter wind load. With flexible backhaul (today or tomorrow's technology) the install cost is even further reduced.

Reduced OPEX through

Lowest power consumption for multimode operation

Automated, hands-free maintenance via SON

Self-optimization and self-healing of any remote sites (no need to send engineers on site/expensive truck rolls)

Split BSC allows for satellite link to be shut down when not in use

SON module Parallel Wireless can adjust RF power levels or shut base station down in non-peak hours Supports a variety of deployment scenarios for coverage and capacity (rural, suburban, mobile black spots, etc.) including greenfield 2G or expanding current 2G footprint Investment protection through future-proof architecture with 3G, 4G, Wi-Fi functionality being built in in the software suite to optimize the investment. This allows MNOs to migrate to 3G, 4G on their timelines at much lower cost and is 5G ready.

Figure 9:
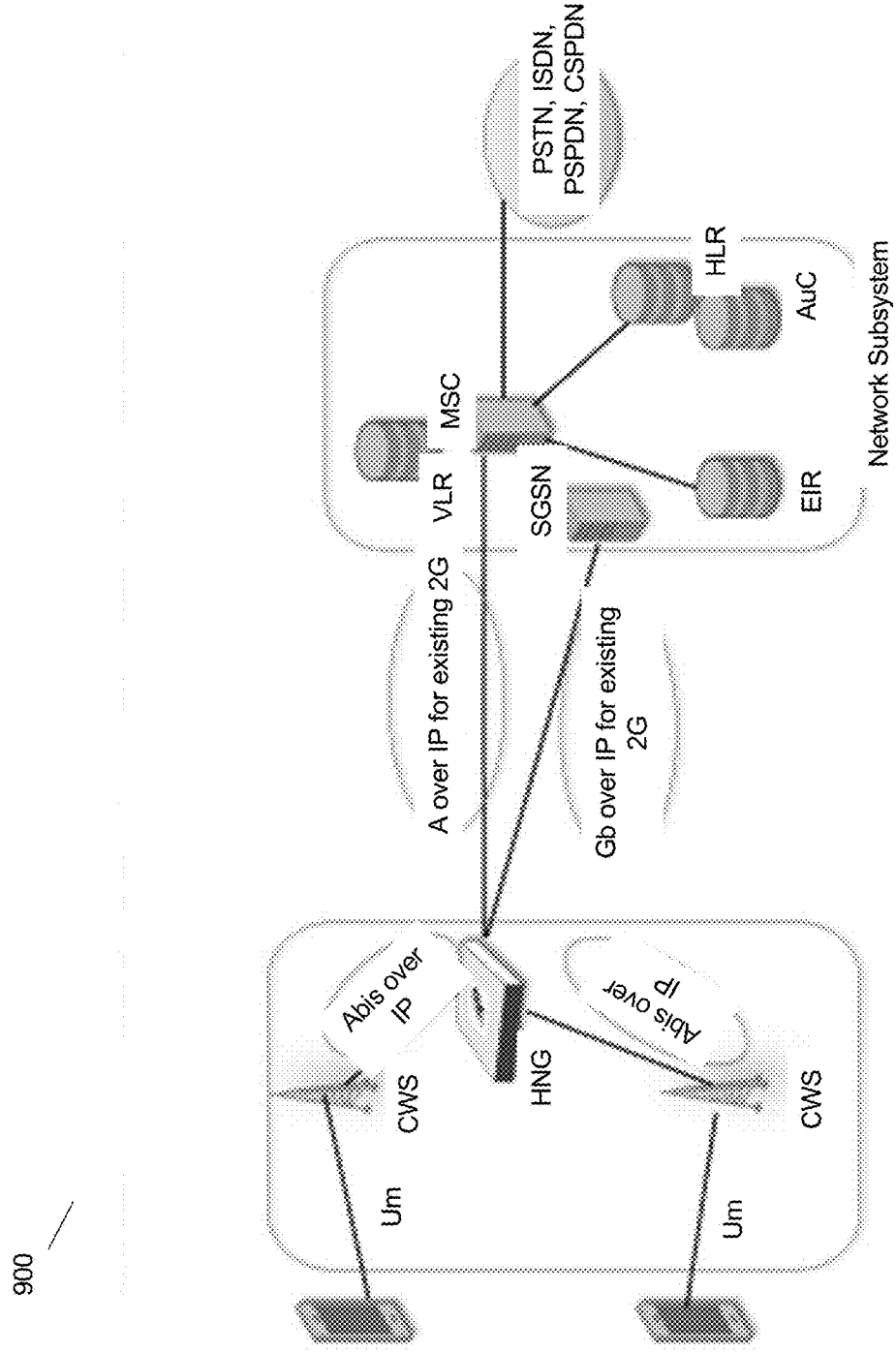
FIG. 9 is a diagram showing a 2G architecture simplification, in accordance with some embodiments.

FIG. 9 is a diagram showing a 2G architecture simplification 900 in accordance with some embodiments.

Abstraction Layer

OpenRAN Software Suite virtualizes the RAN interfaces to manage the 5G, 4G, 3G, 2G cells in real-time via multi-technology SON while abstracting RAN changes from the core network and the core network itself from the RAN. The OpenRAN Software Suite virtualizes thousands of base stations to look like a few virtualized "boomer cells" to the core. The OpenRAN Software Suite virtualizes the radio network resources such as Wi-Fi APs, eNodeBs, NodeBs, and NRs and makes them self-configurable, self-optimizing, and self-healing which helps with the initial installation and on-going maintenance and reduces the overall TCO.

Features and Capabilities

Figure 10:
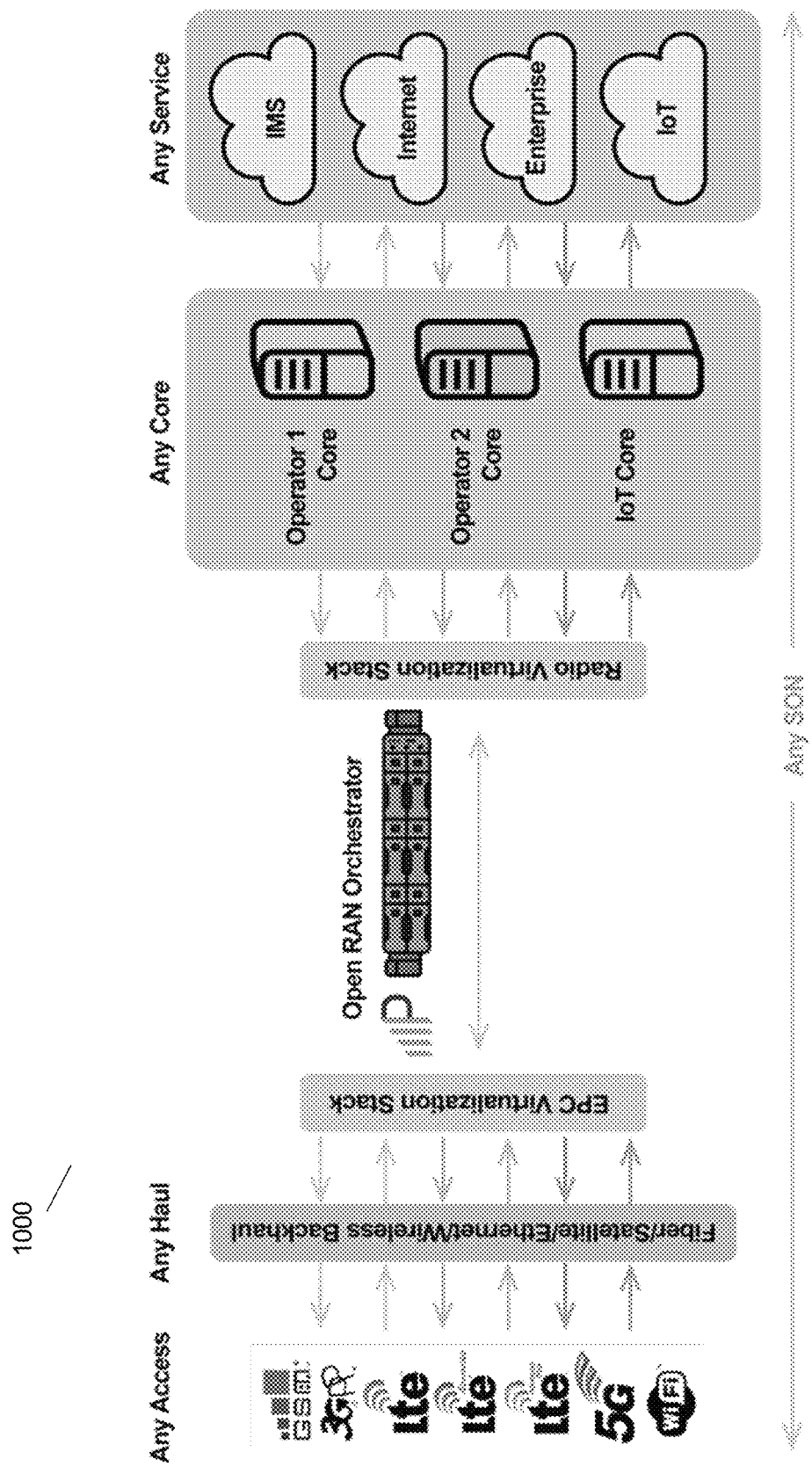
FIG. 10 is a diagram showing a network using an OpenRAN orchestrator, in accordance with some embodiments.

FIG. 10 is a diagram showing a network using an OpenRAN orchestrator 1000, in accordance with some embodiments.

Parallel Wireless OpenRAN Software Suite helps operators cost effectively roll out new cells or Wi-Fi APs and manage coverage and capacity of existing nodes by reducing complexity between RAN and the core sides of the network with abstracting RAN and core sides of the network with "many-to-one-to-many" approach:

On the RAN side of the network, the software virtualizes existing cells into a pool of virtualized resources that can be allocated dynamically. It virtualizes thousands of base stations to look like a few virtualized "supercells" to the core. This capability allows operators to expand their RAN for additional coverage and capacity without putting any additional strain from signaling on the core components. This capability allows the software to aggregate S1 and X2 interfaces from the nodes under its management. This aggregation allows anchoring of all the traffic for seamless handoffs between 5G, 4G, 3G, 2G, and Wi-Fi technologies. The software suite uses all 3GPP standard interfaces to communicate to nearby 2G, 3G, 4G, or 5G macros or Wi-Fi APs: standard X2 interfaces to communicate with nearby 4G macros; as a virtual RNC, uses Iu-CS and Iu-PS interfaces to communicate with MSC and 3G packet core; and SWu interface to talk to Wi-Fi UEs. The software uses this collective information to mitigate interference. OpenRAN Software suite is able to make real-time decisions based on its direct position in the signaling and data path and interworking of various multi-technology virtualized gateway functions. It also handles mobility and session continuity across UMTS, Wi-Fi, LTE or 5G with local anchoring on the OpenRAN controller.

On the core side, the software virtualizes multiple cores into a pool of resources for the multi-technology RANs and presents them as standard interfaces to packet core. By aggregating multi-RAT traffic, the software enables signaling reduction towards the core and mitigates any signaling storms. By virtualizing core towards the RAN, OpenRAN controller allows operators to deploy multiple packet cores, support MOCN, optimize IoT traffic, enable eMBMS, and provide more profitable MVNOs offerings.

This capability is designed to handle deployment challenges from building a new network, to scaling the network, to filling coverage gaps that traditional network architecture is not designed to handle—all at a lower cost.

In addition to being able to handle 5G, 4G, 3G, 2G RAN and Core functionality, the Software Suite would be able to support multiple 5G network architecture deployment options simultaneously. Each gNodeB can be configured to work as an en-gNB for NSA Option 3/3a/3x or as gNB for SA Option 2. Intelligent algorithms in the software platform can handle routing of signalling and data from each eNB/gNB to the required EPC/5GC. The intelligent algorithms are also able to provide slicing like functionality to legacy 2G/3G networks as well as 4G.

In addition, providing multi-radio access technology (multi-RAT) technology within the software suite allows for capacity management that includes increasing or decreasing resources allocated to a particular RAT, including turning individual carriers on and off from a SON coordination layer, using network-initiated handovers to move UEs to other bands, carriers, RATs (inter-technology) etc. Various objectives may be thus achieved, including electrical power savings, CPU or RF resource conservation, reducing MVNO cost by reducing use of underlying billed infrastructure etc. Inter-technology handovers may be contemplated as well, between any two supported RATs. Core resources may be managed by allowing virtual machines or containers, etc. to be spun up or down as needed based on demand and cost.

Slicing helps to support new use cases and differentiated experiences including private networks and will be a source of new revenue for the mobile operators.

Slicing

Figure 11:
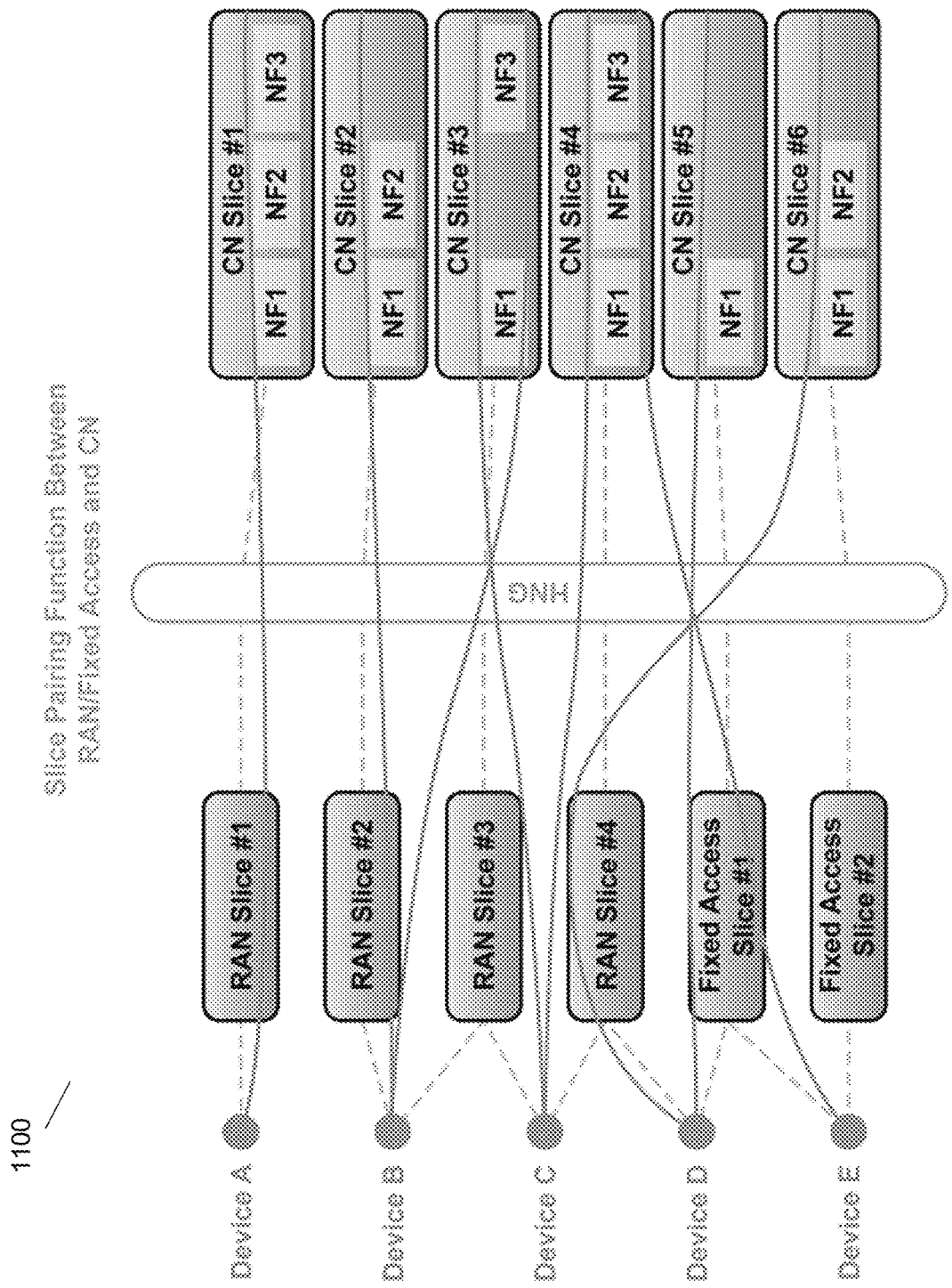
FIG. 11 is a diagram showing network slicing, in accordance with some embodiments.

FIG. 11 is a diagram showing network slicing 1100, in accordance with some embodiments.

In order to support the different type of services, the network resources, all the way from the RAN to the Internet access, will require the ability to have End-to-End 'slices', each of them with their own performance characteristics, isolated from the other slices. Each slice will have a requirement for a different QoS, security considerations, latency characteristics, In-line Services, etc. For example, the network characteristics for a Best Effort IoT slice will differ significantly from a high-end enterprise slice (think throughput, latency, always-on vs intermittent connection, data volume, voice vs data-only)

The OpenRAN Network Software Suite is the only platform that is capable in orchestrating the slicing functionality for all technologies (5G, 4G, 3G, 2G, and Wi-Fi).

The network slicing functionality contains access network slices, core network slices and the selection function in the OpenRAN Software Suite that connects these slices into a complete network slice comprised of both the access network and the core network (CN). The selection function routes communications to an appropriate CN slice that is tailored to provide specific services. The criteria of defining the access slices and CN slices include the need to meet different service/applications requirements and to meet different communication requirements. Each core network slice is built from a set of network functions (NFs). An important factor in slicing is that some NFs can be used across multiple slices, while other NFs are tailored to a specific slice.

In addition to being able to handle 2G, 3G & 4G RAN and Core functionality, the Software Suite would be able to support multiple 5G network architecture deployment options simultaneously. Each gNodeB can be configured to work as a gNB for NSA Option 3/3a/3x or as gNB for SA Option 2. Intelligent algorithms in the software platform can handle routing of signalling and data from each eNB/gNB to the required EPC/5GC. The intelligent algorithms are also able to provide slicing like functionality to legacy 2G/3G networks as well as 4G.

Slicing helps support new use cases and differentiated experiences including private networks and will be a source of new revenue for the mobile operators.

Unified

Function Consolidation

Many functions like Small Cell GW, Home ENodeB GW and others are consolidates on one COTS server.

Unified Wi-Fi GW

Wi-Fi gateway functionality support in the unified architecture delivers seamless mobility and new services like offload, voice services (VoWiFi).

Cloud Native vEPC

Seamless convergence of multiple networks into one unified network. Provides scalable packet core (MME, SGW, PGW).

5G Core

5G Core is Service-Based Architecture (SBA), it is designed from the ground-up for complete control and user plane separation. Rather than physical network elements, the 5G Core comprises virtualized, software-based cloud native network functions (or services). Our 5G packet core enables new services for operators to generate new revenue streams. Smooth and cost effective transition from 4G to 5G. Network automation with cloud native architecture and deployment flexibility.

Network Slicing

For all G networks and end to end from RAN, transport to the core. Enables differentiated service for Private LTE networks: Network as a Service. Has the ability to have End-to-End 'slices', each of them with their own performance characteristics, isolated from the other slices. Each slice has a requirement for a different QoS, security considerations, latency characteristics, Inline Services, etc. (i.e. the network characteristics for a Best Effort IoT slice will differ significantly from a high-end Private LTE/Enterprise slice (throughput, latency, always-on vs intermittent connection, data volume, voice vs data-only)

Abstraction Layer

With edge centric architecture, decouple core networks from RANs by abstraction core side to a virtualization layer to enable G unification on the RAN side and core sharing, including RAT abstraction, band abstraction, carrier abstraction. The RAT is able to work with any RAT core using a combination of abstraction, interworking, stateful proxying; the abstraction layer determines what core resources are able to handle the demands of the RAN nodes requesting service, and thereby selects the appropriate core to provide the services, which may include in some instances serving a given RAN node using one RAT (for instance, 4G LTE) using another RAT in the core (for instance, 5GC).

Performance

High capacity, high throughput solution, taking advantage of latest compute and technology advances, riding the Intel curve, high availability, linear and elastic scaling, runs on any COTS based infrastructure. Supports the demands of high throughput 5G network.

Multi-Tenant/Sharing

MORAN/MOCN

It quite easily enables MOCN, by having the ability to interrogate the traffic and route to the proper Core. This then allows RAN sharing to happen without complication to any of the home networks, the HetNet Gateway simply requires connections to each Core and handles the heavy lifting of routing of the traffic properly. In turn, each Core network manages their users as if they are on the Home network. This allows services such as RCS, VoLTE, LI, etc. to remain viable regardless of the fact that the User is not in effect on a Home network. This is a key capability for new use cases like Private LTE (MOCN) and 5G network densification (MORAN).

Secure

Security GW

Part of the overall architecture, virtualized, high capacity Security Gateway for edge and network security.

Network Intelligence and Automation

Enabling Intelligent and Profitable Networks

Big Data Enabled

Analytics

Network Intelligence

Real Time ALL G SON

As the HetNet GW unifies and abstracts the RAN while orchestrating it in real-time, making it self-configuring, self-optimizing, and self-healing, any RAN additions to the network are done quickly, without specialized staff and without compromising QoE. X2-based Inter-cell Interference Coordination (ICIC) functionality improves the cell-edge experience, as the HetNet GW SON mitigates interference to ensure optimal QoE for each subscriber.

NFV-Enabled

Intelligent Network Orchestration

Fully virtualized, across the network from ran to core—key for network slicing across all g with son. Delivers automation and programmability across all g for professional services savings. Acts as an any-ap/node unifier/orchestrator, anchors the traffic, and handles any mobility handoffs locally. This results in seamless handoff for the wireless users as they switch between different technologies indoors and outdoors PW leads the innovation in wireless infrastructure with software-defined unified cloud native OpenRAN architecture with world's largest OpenRAN ecosystem delivering substantial cost savings to MNOs when building or maintaining today's 4G 3G 2G and tomorrow's multi-vendor 5G networks to enable quality experience to the end users and industries.

Parallel Wireless created world's only ALL G software enabled OpenRAN architecture to make delivery of wireless coverage or capacity use cases, especially capital intensive 5G, affordable as it enables mobile operators and industries to unleash the full value of connectivity. With unified across 5G 4G 3G 2G cloud native architecture that is open and standardized across five key domains—RAN, Edge, Core, Orchestration and Analytics—we are committed to 5G vision of bringing Internet to every person and organization for a truly connected world. The company's end-to-end ALL G cloud native OpenRAN portfolio is designed to help our customers modernize their networks, reduce deployment cost and complexity, increase operational efficiency, find new revenue streams and start deploying multi-vendor 5G networks today. Through open collaboration with OpenRAN ecosystem partners, we created world's first and largest fully compliant OpenRAN ecosystem that delivers the next generation of wireless infrastructure to be much lower cost ensuring more equal access to 5G globally. Our customers include over 60 global mobile operators, as well as private and public industries and governments that use our software defined network portfolio to reimagine their networks.

Differentiated Services at the Edge

Figure 12:
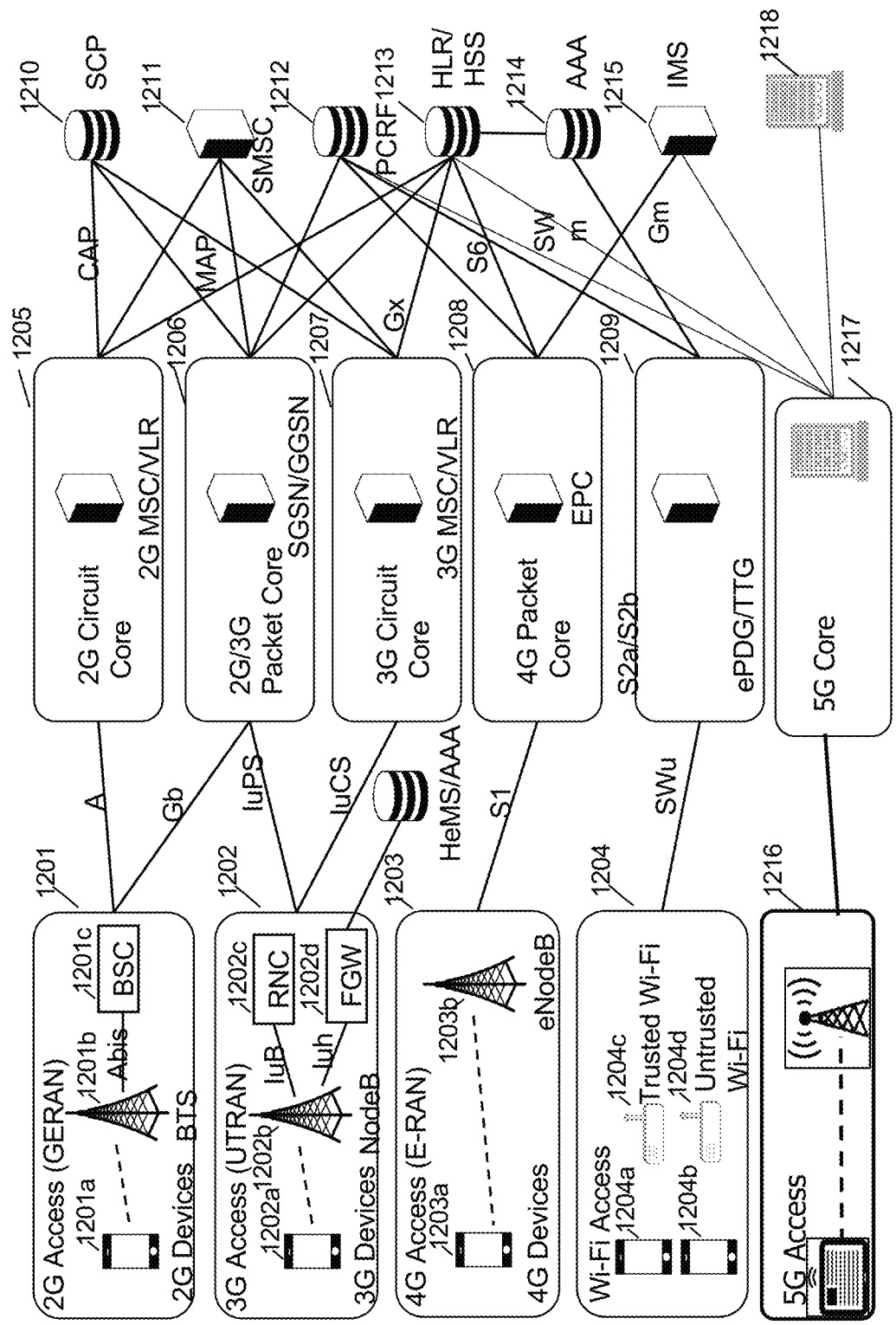
FIG. 12 is a schematic network architecture diagram for 3G and other-G prior art networks.

FIG. 12 is a schematic network architecture diagram for 3G and other-G prior art networks. The diagram shows a plurality of "Gs," including 2G, 3G, 4G, 5G and Wi-Fi. 2G is represented by GERAN 1201, which includes a 2G device 1201a, BTS 1201b, and BSC 1201c. 3G is represented by UTRAN 1202, which includes a 3G UE 1202a, nodeB 1202b, RNC 1202c, and femto gateway (FGW, which in 3GPP namespace is also known as a Home nodeB Gateway or HNBGW) 1202d. 4G is represented by EUTRAN or E-RAN 1203, which includes an LTE UE 1203a and LTE eNodeB 1203b. Wi-Fi is represented by Wi-Fi access network 1204, which includes a trusted Wi-Fi access point 1204c and an untrusted Wi-Fi access point 1204d. The Wi-Fi devices 1204a and 1204b may access either AP 1204c or 1204d. In the current network architecture, each "G" has a core network. 2G circuit core network 1205 includes a 2G MSC/VLR; 2G/3G packet core network 1206 includes an SGSN/GGSN (for EDGE or UMTS packet traffic); 3G circuit core 1207 includes a 3G MSC/VLR; 4G circuit core 1208 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 1230, the SMSC 1231, PCRF 1232, HLR/HSS 1233, Authentication, Authorization, and Accounting server (AAA) 1234, and IP Multimedia Subsystem (IMS) 1235. An HeMS/AAA 1236 is present in some cases for use by the 3G UTRAN. The diagram is used to indicate schematically the basic functions of each network as known to one of skill in the art, and is not intended to be exhaustive. For example, 5G core 1217 is shown using a single interface to 5G access 1216, although in some cases 5G access can be supported using dual connectivity or via a non-standalone deployment architecture.

Noteworthy is that the RANs 1201, 1202, 1203, 1204 and 1236 rely on specialized core networks 1205, 1206, 1207, 1208, 1209, 1237 but share essential management databases 1230, 1231, 1232, 1233, 1234, 1235, 1238. More specifically, for the 2G GERAN, a BSC 1201c is required for Abis compatibility with BTS 1201b, while for the 3G UTRAN, an RNC 1202c is required for Iub compatibility and an FGW 1202d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 13:
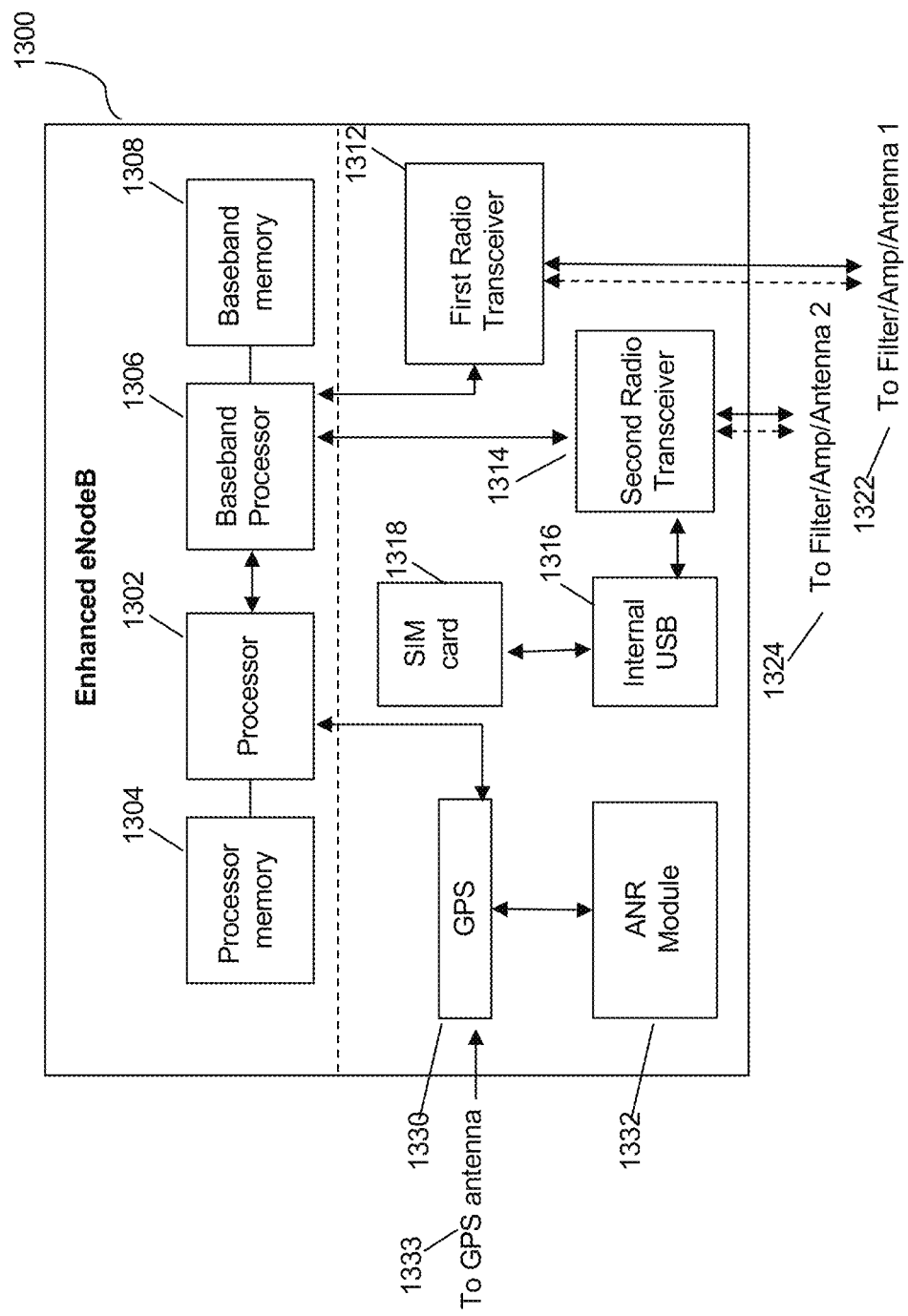
FIG. 13 is diagram of an enhanced eNodeB for performing the methods described herein, in accordance with some embodiments.

FIG. 13 shows an enhanced eNodeB for performing the methods described herein, in accordance with some embodiments. eNodeB 1300 may include processor 1302, processor memory 1304 in communication with the processor, baseband processor 1306, and baseband processor memory 1308 in communication with the baseband processor. Mesh network node 1300 may also include first radio transceiver 1312 and second radio transceiver 1314, internal universal serial bus (USB) port 1316, and subscriber information module card (SIM card) 1318 coupled to USB port 1316. In some embodiments, the second radio transceiver 1314 itself may be coupled to USB port 1316, and communications from the baseband processor may be passed through USB port 1316. The second radio transceiver may be used for wirelessly backhauling eNodeB 1300.

Processor 1302 and baseband processor 1306 are in communication with one another. Processor 1302 may perform routing functions, and may determine if/when a switch in network configuration is needed. Baseband processor 1306 may generate and receive radio signals for both radio transceivers 1312 and 1314, based on instructions from processor 1302. In some embodiments, processors 1302 and 1306 may be on the same physical logic board. In other embodiments, they may be on separate logic boards.

Processor 1302 may identify the appropriate network configuration, and may perform routing of packets from one network interface to another accordingly. Processor 1302 may use memory 1304, in particular to store a routing table to be used for routing packets. Baseband processor 1306 may perform operations to generate the radio frequency signals for transmission or retransmission by both transceivers 1310 and 1312. Baseband processor 1306 may also perform operations to decode signals received by transceivers 1312 and 1314. Baseband processor 1306 may use memory 1308 to perform these tasks.

The first radio transceiver 1312 may be a radio transceiver capable of providing LTE eNodeB functionality, and may be capable of higher power and multi-channel OFDMA. The second radio transceiver 1314 may be a radio transceiver capable of providing LTE UE functionality. Both transceivers 1312 and 1314 may be capable of receiving and transmitting on one or more LTE bands. In some embodiments, either or both of transceivers 1312 and 1314 may be capable of providing both LTE eNodeB and LTE UE functionality. Transceiver 1312 may be coupled to processor 1302 via a Peripheral Component Interconnect-Express (PCI-E) bus, and/or via a daughtercard. As transceiver 1314 is for providing LTE UE functionality, in effect emulating a user equipment, it may be connected via the same or different PCI-E bus, or by a USB bus, and may also be coupled to SIM card 1318. First transceiver 1312 may be coupled to first radio frequency (RF) chain (filter, amplifier, antenna) 1322, and second transceiver 1314 may be coupled to second RF chain (filter, amplifier, antenna) 1324.

SIM card 1318 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1300 is not an ordinary UE but instead is a special UE for providing backhaul to device 1300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1312 and 1314, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1302 for reconfiguration.

A GPS module 1330 may also be included, and may be in communication with a GPS antenna 1332 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1332 may also be present and may run on processor 1302 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 14:
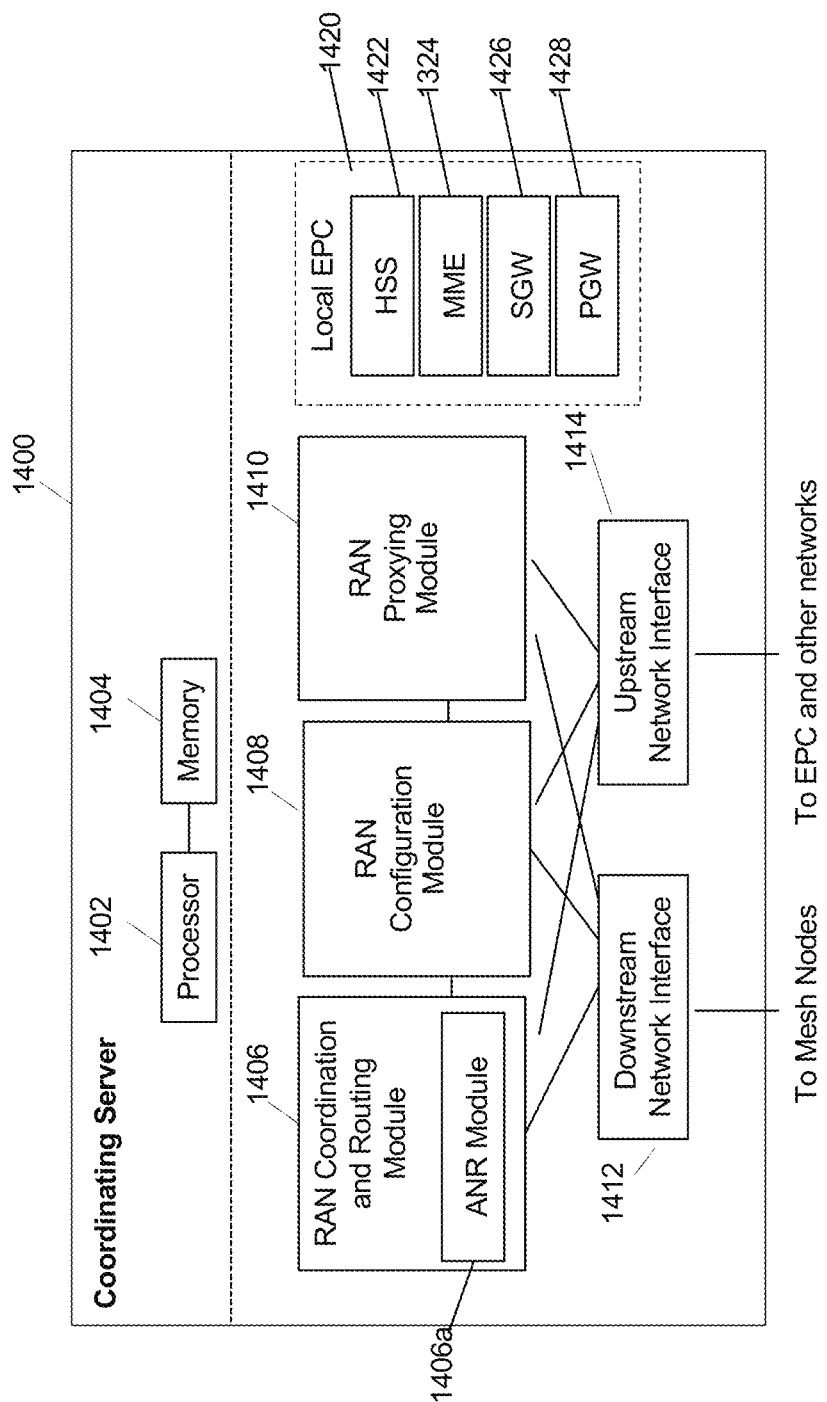
FIG. 14 is a diagram of is a coordinating server for providing services and performing methods as described herein, in accordance with some embodiments.

FIG. 14 is a coordinating server for providing services and performing methods as described herein, in accordance with some embodiments. Coordinating server 1400 includes processor 1402 and memory 1404, which are configured to provide the functions described herein. Also present are radio access network coordination/routing (RAN Coordination and routing) module 1406, including ANR module 1406*a*, RAN configuration module 1408, and RAN proxying module 1410. The ANR module 1406*a* may perform the ANR tracking, PCI disambiguation, ECGI requesting, and GPS coalescing and tracking as described herein, in coordination with RAN coordination module 1406 (e.g., for requesting ECGIs, etc.). In some embodiments, coordinating server 1400 may coordinate multiple RANs using coordination module 1406. In some embodiments, coordination server may also provide proxying, routing virtualization and RAN virtualization, via modules 1410 and 1408. In some embodiments, a downstream network interface 1412 is provided for interfacing with the RANs, which may be a radio interface (e.g., LTE), and an upstream network interface 1414 is provided for interfacing with the core network, which may be either a radio interface (e.g., LTE) or a wired interface (e.g., Ethernet).

Coordinator 1400 includes local evolved packet core (EPC) module 1420, for authenticating users, storing and caching priority profile information, and performing other EPC-dependent functions when no backhaul link is available. Local EPC 1420 may include local HSS 1422, local MME 1424, local SGW 1426, and local PGW 1428, as well as other modules. Local EPC 1420 may incorporate these modules as software modules, processes, or containers. Local EPC 1420 may alternatively incorporate these modules as a small number of monolithic software processes. Modules 1406, 1408, 1410 and local EPC 1420 may each run on processor 1402 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G standard or the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 5G technology is described, the inventors have understood that other RATs have similar equivalents, such as a gNodeB and eNB in 4G. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A 5G OpenRAN controller, comprising:
a $5^{th}$ generation core (5GC) and evolved packet core (EPC) virtualization stack interface for virtualizing core resources having distinct performance characteristics;
a radio virtualization stack interface for virtualizing radio resources having distinct performance characteristics; and
a slice selection function executing on the 5G OpenRAN controller,
wherein the 5G OpenRAN controller virtualizes existing cells using the radio virtualization stack interface into a pool of virtualized radio access network (RAN) resources that can be allocated dynamically; and
wherein the 5G OpenRAN controller virtualizes multiple cores using the 5GC and EPC virtualization stack interface into a pool of virtualized core resources for multi-technology RANs and presents them as standard interfaces to at least one of the 5GC and the evolved packet core, and
wherein the slice selection function connects a virtualized radio resource and a virtualized core resource to create a network slice,
thereby providing any-G network slicing.

2. The 5G OpenRAN controller of claim 1 wherein 5G OpenRAN controller virtualizes a plurality of base stations to look like a few virtualized supercells to the core, and allows operators to expand their RAN for additional coverage and capacity without putting any additional strain from signaling on the core components.

3. The 5G OpenRAN controller of claim 1 wherein 5G OpenRAN controller aggregate S1 and X2 interfaces from the nodes under its management.

4. The 5G OpenRAN controller of claim 3 wherein aggregating of S1 and X2 interfaces allows anchoring of all the traffic for seamless handoffs between 5G, 4G, 3G, 2G, and Wi-Fi technologies.

5. The 5G OpenRAN controller of claim 1 wherein the software suite uses all 3GPP standard interfaces to communicate to nearby 2G, 3G, 4G, or 5G macros or Wi-Fi access points; uses standard X2 interfaces to communicate with nearby 4G macros as a virtual radio network controller (RNC), uses Iu-CS and Iu-PS interfaces to communicate with mobile switching center (MSC) and 3G packet core; and uses SWu interface to talk to Wi-Fi UEs.

6. The 5G OpenRAN controller of claim 5 wherein the software uses collective information to mitigate interference; to make real-time decisions based on its direct position in the signaling and data path and interworking of various multi-technology virtualized gateway functions; and handles mobility and session continuity across UMTS, Wi-Fi, LTE or 5G with local anchoring on the OpenRAN controller.

7. The 5G OpenRAN controller of claim 1 wherein the software aggregates multi-RAT traffic, and enables signaling reduction towards the core, and mitigates signaling storms.

8. The 5G OpenRAN controller of claim 1 wherein the software allows operators to deploy multiple packet cores, support multi-operator core networks (MOCN), optimize IoT traffic, and enable evolved multimedia broadcast multicast service (eMBMS).

9. The 5G OpenRAN controller of claim 1, wherein the slice selection function connects a virtualized radio resource that supports 2G or 3G with a virtualized core network that supports 2G or 3G.

10. A method of operating a 5G OpenRAN controller, comprising:
providing an interface for a $5^{th}$ generation core (5GC) and an evolved packet core (EPC) virtualization stack interface for virtualizing core resources having distinct performance characteristics;
providing an interface for a radio virtualization stack interface for virtualizing radio resources having distinct performance characteristics; and
providing a slice selection function on the 5G OpenRAN controller,
wherein the 5G OpenRAN controller virtualizes existing cells using the radio virtualization stack interface into a pool of virtualized radio access network (RAN) resources that can be allocated dynamically; and
wherein the 5G OpenRAN controller virtualizes multiple cores using the 5GC and EPC virtualization stack interface into a pool of virtualized core resources for multi-technology RANs and presents them as standard interfaces to at least one of the 5GC and the evolved packet core, and
wherein the slice selection function connects a virtualized radio resource and a virtualized core resource to create a network slice,
thereby providing any-G network slicing.

11. The method of claim 10 further comprising virtualizing a plurality of base stations to look like a few virtualized supercells to the core, and allowing operators to expand their RAN for additional coverage and capacity without putting any additional strain from signaling on the core components.

12. The method of claim 10 further comprising aggregating S1 and X2 interfaces from the nodes under its management.

13. The method of claim 12 wherein aggregating of S1 and X2 interfaces allows anchoring of all the traffic for seamless handoffs between 5G, 4G, 3G, 2G, and Wi-Fi technologies.

14. The method of claim 10 further comprising using all 3GPP standard interfaces to communicate to nearby 2G, 3G, 4G, or 5G macros or Wi-Fi access points; using standard X2 interfaces to communicate with nearby 4G macros as a virtual radio network controller (RNC), using Iu-CS and Iu-PS interfaces to communicate with mobile switching center (MSC) and 3G packet core; and using SWu interface to talk to Wi-Fi UEs.

15. The method of claim 14 further comprising using collective information for mitigating interference; making real-time decisions based on its direct position in the signaling and data path and interworking of various multi-technology virtualized gateway functions; and handling mobility and session continuity across UMTS, Wi-Fi, LTE or 5G with local anchoring on the OpenRAN controller.

16. The method of claim 10 further comprising aggregating multi-RAT traffic, enabling signaling reduction towards the core, and mitigating signaling storms.

17. The method of claim 10 further comprising deploying multiple packet cores, supporting multi-operator core networks (MOCN), optimizing IoT traffic, and enabling evolved multimedia broadcast multicast service (eMBMS).

18. The method of claim 10, further comprising connecting a virtualized radio resource that supports 2G or 3G with a virtualized core network that supports 2G or 3G.

19. A non-transitory computer-readable medium containing instructions for operating a 5G OpenRAN controller which, when executed, cause the OpenRAN controller to perform steps comprising:
providing an interface for a $5^{th}$ generation core (5GC) and an evolved packet core (EPC) virtualization stack interface for virtualizing core resources having distinct performance characteristics;
providing an interface for a radio virtualization stack interface for virtualizing radio resources having distinct performance characteristics; and
providing a slice selection function on the 5G OpenRAN controller,
wherein the 5G OpenRAN controller virtualizes existing cells using the radio virtualization stack interface into a pool of virtualized radio access network (RAN) resources that can be allocated dynamically; and
wherein the 5G OpenRAN controller virtualizes multiple cores using the 5GC and EPC virtualization stack interface into a pool of virtualized core resources for multi-technology RANs and presents them as standard interfaces to at least one of the 5GC and the evolved packet core, and
wherein the slice selection function connects a virtualized radio resource and a virtualized core resource to create a network slice,
thereby providing any-G network slicing.

20. The non-transitory computer-readable medium of claim 19, wherein the slice selection function connects a virtualized radio resource that supports 2G or 3G with a virtualized core network that supports 2G or 3G.

* * * * *